US012657517B1

(12) United States Patent  (10) Patent No.:  US 12,657,517 B1
Holt et al.  (45) Date of Patent:  Jun. 16, 2026

(54) METHODS FOR ARTIFICIAL INTELLIGENCE DATA EXCHANGE NETWORKS

(71) Applicant: Technica Pacifica LLC, Incline Village, NV (US)

(72) Inventors: Brian Holt, Incline Village, NV (US); Sam Elhag, San Diego, CA (US)

(73) Assignee: Technica Pacifica LLC, Incline Village, NV (US)

( * ) Notice: Subject to any disclaimer, the term of this patent is extended or adjusted under 35 U.S.C. 154(b) by 0 days.

(21) Appl. No.: 18/244,265

(22) Filed: Sep. 10, 2023

Related U.S. Application Data

(60) Provisional application No. 63/521,630, filed on Jun. 16, 2023, provisional application No. 63/464,509, filed on May 5, 2023, provisional application No. 63/456,423, filed on Mar. 31, 2023, provisional application No. 63/450,050, filed on Mar. 5, 2023.

(51) Int. Cl.
G06N 20/00 (2019.01)

(52) U.S. Cl.
CPC ..................................... G06N 20/00 (2019.01)

(58) Field of Classification Search
CPC ....................................................... G06N 20/00
See application file for complete search history.

(56) References Cited

U.S. PATENT DOCUMENTS

| | | | |
|---|---|---|---|
| 5,002,491 A | 3/1991 | Abrahamson et al. | |
| 6,075,968 A | 6/2000 | Morris et al. | |
| 9,652,993 B2 | 5/2017 | Dodelson et al. | |
| 10,482,391 B1 | 11/2019 | Lynch | |
| 10,853,062 B1 | 12/2020 | Holt | |
| 10,942,709 B2 | 3/2021 | Holt | |
| 11,011,068 B2 | 5/2021 | Govil et al. | |
| 11,011,069 B1 | 5/2021 | Wolf | |
| 11,017,686 B2 | 5/2021 | Weintraub | |
| 11,030,919 B2 | 6/2021 | Booth et al. | |
| 11,100,288 B1 * | 8/2021 | Gowayyed | G06N 3/084 |
| 11,120,701 B2 | 9/2021 | Ahn et al. | |
| 11,138,895 B2 | 10/2021 | Shammout | |
| 11,244,576 B2 | 2/2022 | Baker et al. | |
| 11,250,719 B2 | 2/2022 | Deshmukh et al. | |
| 11,250,721 B2 | 2/2022 | Angel et al. | |
| 11,314,702 B2 | 4/2022 | Seiler, III et al. | |
| 11,347,784 B1 | 5/2022 | Yen et al. | |
| 11,348,476 B2 | 5/2022 | Lewis et al. | |
| 11,443,645 B2 | 9/2022 | Kozloski et al. | |
| 11,455,903 B2 | 9/2022 | Lynch | |
| 2008/0097998 A1 * | 4/2008 | Herbach | G06F 16/00 707/999.009 |
| 2008/0120156 A1 * | 5/2008 | Nusbaum | G06Q 30/02 705/14.46 |
| 2008/0281622 A1 * | 11/2008 | Hoal | G06Q 50/01 706/46 |
| 2010/0190145 A1 | 7/2010 | Singer et al. | |

(Continued)

*Primary Examiner* — Casey R. Garner

(74) *Attorney, Agent, or Firm* — Clause Eight; Michael Catania

(57)  ABSTRACT

Methods for artificial intelligence data exchange networks are disclosed herein. The method includes generating a response to the prompt using the data in the data file in connection with artificial intelligence. The method also includes fulfilling a condition for use of the data, and returning a response to a user.

7 Claims, 17 Drawing Sheets

(56)          References Cited

U.S. PATENT DOCUMENTS

| | | | | |
|---|---|---|---|---|
| 2011/0225293 | A1* | 9/2011 | Rathod | H04W 4/60 |
| | | | | 709/224 |
| 2012/0040326 | A1 | 2/2012 | Larson-Rutter et al. | |
| 2012/0066062 | A1* | 3/2012 | Yoder | G06Q 30/0253 |
| | | | | 705/14.51 |
| 2018/0005540 | A1 | 1/2018 | Chetlur et al. | |
| 2019/0220894 | A1* | 7/2019 | Spears | G06Q 30/0255 |
| 2020/0380155 | A1* | 12/2020 | Sarferaz | G06F 16/2455 |
| 2022/0180218 | A1 | 6/2022 | Kil et al. | |
| 2023/0289323 | A1* | 9/2023 | Wakabayashi | G06F 21/60 |
| 2023/0316001 | A1* | 10/2023 | Araki | G06F 40/40 |
| | | | | 704/9 |
| 2024/0338686 | A1* | 10/2024 | Davis | G06Q 20/42 |

* cited by examiner

METHODS FOR ARTIFICIAL INTELLIGENCE DATA EXCHANGE NETWORKS

CROSS REFERENCES TO RELATED APPLICATIONS

The present application claims priority to U.S. Provisional Patent Application No. 63/521,630, filed on Jun. 16, 2023, U.S. Provisional Patent Application No. 63/464,509, filed on May 5, 2023, U.S. Provisional Patent Application No. 63/456,423, filed on Mar. 31, 2023, and U.S. Provisional Patent Application No. 63/450,050, filed on Mar. 5, 2023, each of which is hereby incorporated by reference in their entirety.

STATEMENT REGARDING FEDERALLY SPONSORED RESEARCH OR DEVELOPMENT

Not Applicable

BACKGROUND OF THE INVENTION

Technical Field

The present invention generally related to artificial intelligence data exchange networks.

Description of the Related Art

There has been a recent explosion in generative artificial intelligence (AI) models. These models generate responses to user prompts by training neural networks on large corpuses using a variety of architectures such as convolutional neural networks (CNN), recurrent neural networks (RNN), and transformer-based neural networks. Types of generative AI models include text generation (often called Large Language Models (LLM)), image generation models, audio generation models, and video generation models. Example generative AIs include GPT by OpenAI, DALL-E by OpenAI, Stable Diffusion, MidJourney, LLaMA by Meta, and Bard by Alphabet.

These models typically train on publicly available data, for example from Internet websites. Websites contain many types of text that can be used to train AI models such as books, articles, social media, patent text, medical text, questions and answers, chat logs, or email logs. One method of securing a large volume of text is known as scraping, a process by which an automated script crawls a website and saves all the text uncovered in a structured or unstructured manner. Another method is pulling data from a website using an Application Programming Interface (API).

Similarly, imaging models require large data sets. These imaging data sets may be scraped or pulled via API from various web sources.

A website may contain copyrighted text, images, video, or other media formats. This content often includes a license or permitted use policy. For example, Creative Commons licenses allow creators to specify how others can use their work, by allowing others to use, distribute, and build upon their work in different ways. A Creative Commons license can be included on a website using machine-readable html code.

A website may be monetized by displaying digital advertising. For example, GOOGLE ADSENSE services provides a snippet of code that analyzes a website's content and displays relevant ads in various formats. These formats may include text, display, or video ads. These advertisements generally compensate the website owner based on the number of views or clicks to those ads.

A generative AI model may derive revenue from its responses to user prompts. For example, the model may display advertisements, earn a revenue share for user purchases, or charge a monthly fee.

By returning a generated response directly to a user, a generative AI model potentially reduces traffic to the source websites on which it trains, thus potentially reducing those website's revenues. Accordingly, owners of source data on which these AIs are trained seek methods for controlling how their data may be used for training and potential fees for doing do.

A standardized machine-readable text format for websites is needed to effectively communicate acceptable use, data types or tags, compensation requirements, and other parameters with models, bots, or scripts. A standardized format will allow a model, bot, or script to pull or analyze data from multiple sources or a network of sources easily, while honoring the model training and data use requirements, providing attribution, and calculating compensation.

Many third-party services offer standardization for machine-readable text formats, allowing websites to easily communicate with other scripts. For example, GOOGLE's ADSENSE service uses a standardized format for publishers to define ad placements on their websites. ADSENSE service_provides a machine-readable text format called AdSense code, which is a snippet of HTML code that publishers can insert into their website's code. This code communicates with ADSENSE bots and instructs them on where to display ads on the website. By providing this standardized format, AdSense simplifies the process of defining ad placements, ensures consistency in the ad display, and ultimately results in more effective ad targeting for advertisers. Other third-party services also offer standardized formats for tasks such as data extraction, content management, and search engine optimization.

Additionally, generative AIs require new techniques for appropriately sharing data. As various disparate services integrate with AIs, the AI must develop rules for how a user's data is shared between services. Further, as AI generates more and more content, it must be able to discern which information is appropriate to share with which user.

Ideally, a neural network is able to train on one large corpus of data as larger corpuses lead to more accurate predictions. For example, a neural network trained on 1,000 examples might be 99.0% accurate, while that same network trained on 10,000 examples might be 99.9% accurate. However, training on one large corpus is not always possible. For example, institutions in the United States storing medical data such as Electronic Health Records (EHR) are heavily restricted by privacy regulations such as the Health Insurance Portability and Accountability Act of 1996 (HIPAA). Such institutions may be able to train a neural network within their own network, but may not be able to share this data outside of their network. This results in each institution having a neural network trained on its particular subset of data, but precludes one neural network training on the complete set of all the data and presumably making more accurate predictions.

BRIEF SUMMARY OF THE INVENTION

A first aspect of the present invention is artificial intelligence (AI), machine learning (ML), and artificial neural networks (ANN).

A second aspect of the present invention is blockchain, cryptography, and cryptocurrency.

A third aspect of the present invention is commerce, e-commerce, affiliate marketing, advertising, and wire transferring.

A fourth aspect of the present invention is computer networking, the Internet, and the World Wide Web (WWW).

A fifth aspect of the present invention is intellectual property, database rights, and copyrights.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Those skilled in the art will recognize the included drawings provide only a few illustrative examples of possible embodiments of the present invention. It is to be understood that the scope of the present invention includes the many combinations, modifications, and embodiments that may be derived from these drawings. Elements of these drawings are conceptual representations of computer processes which those skilled in the art will recognize as a combination of computer software and hardware. Certain similar elements are given the same reference number across drawings, it is to be understood that aspects of these elements may differ somewhat according to the needs of the particular embodiment.

Figure 1:
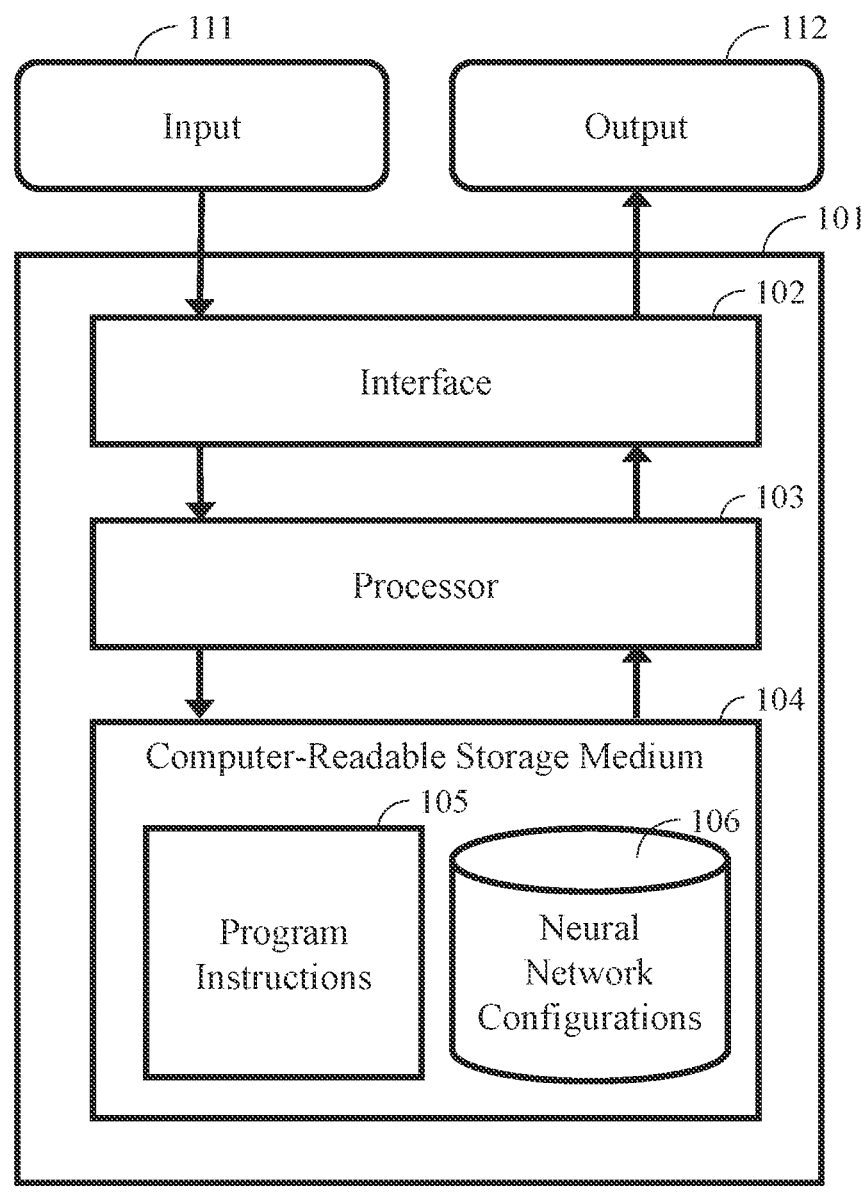
FIG. 1 illustrates an AI computing device.

FIG. 1 illustrates an AI computing device. A computing device 101 receives input 111 to an interface device 102. In one embodiment, the interface device 102 is a user interface such as a keyboard, microphone, or camera. In another embodiment, the interface device 102 is a network interface that receives network signals such as TCP/IP packets. The interface 102 electronically transmits input information to the processor 103. The processor 103 is optionally a Central Processing Unit (CPU), Graphics Processing Unit (GPU), Application-Specific Integrated Circuit (ASIC), Field Programmable Gate Array (FPGA), or combination thereof. In one embodiment, the processor 103 comprises an array of processor units configured for concurrent processing. The processor 103 reads program instructions 105 and neural network configurations 106 from a computer readable storage medium 104. The computer readable storage medium 104 is optionally a hard drive, solid state memory, random access memory, compact disc, or similar. The program instructions 105 optionally comprise application logic, authorization, rate limiting, caching, and/or user interfaces. In one embodiment, The program instructions 105 comprise a library such as PyTorch or TensorFlow. The neural network configurations 106 typically comprise weights and bias values for synapses and neurons, respectively, to be used in processing the input 111 by the processor 103. The processor 103 processes the input 111 according to the program instructions 105 and neural network configurations 106. The processor 103 transmits and electronic signal to the interface 102 which returns the output 112.

Figure 2:
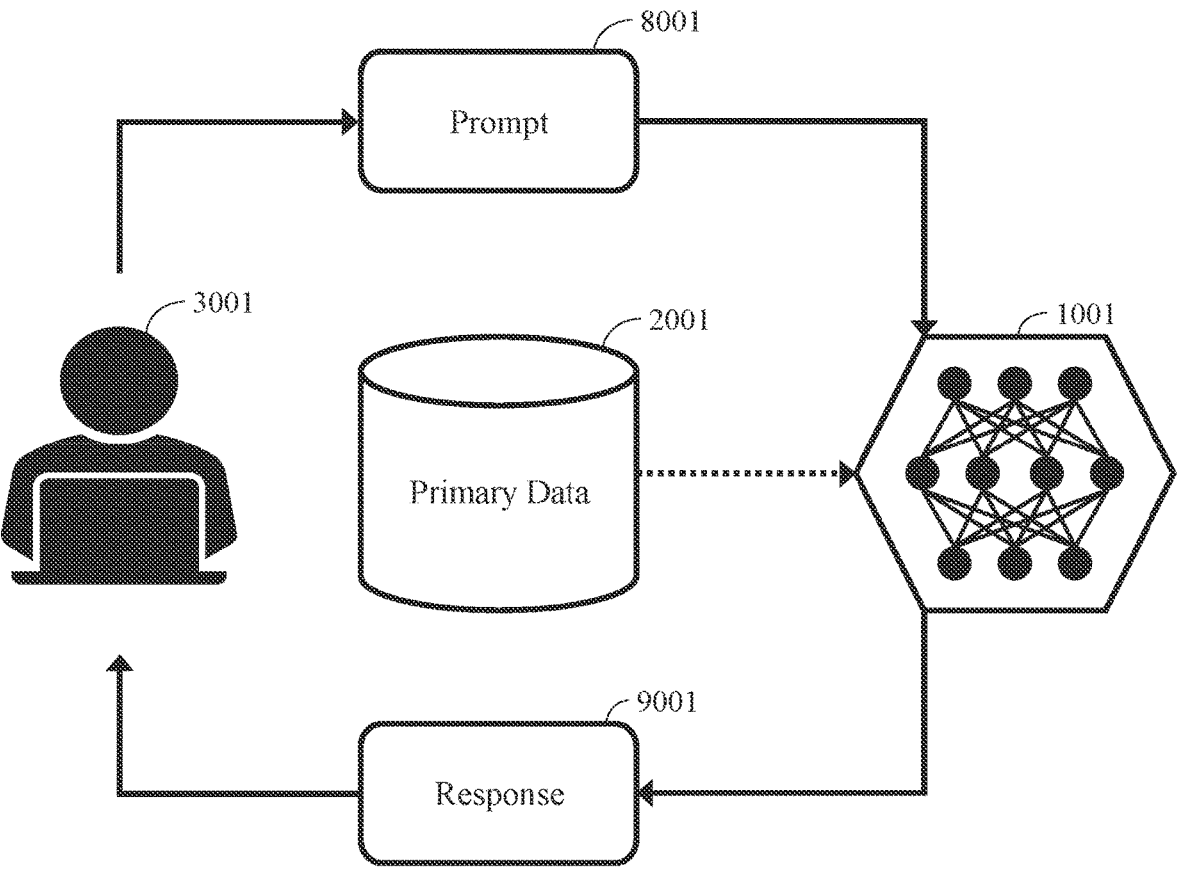
FIG. 2 illustrates a generative AI cycle.

FIG. 2 illustrates a generative AI cycle. A user 3001 sends a prompt 8001 to a generative Artificial Intelligence (AI) program 1001 which has been trained on primary data 2001 to generate a response 9001.

The user 3001 is optionally a person or legal entity or computer. In one example, the user 3001 is a person typing the prompt 8001 on a laptop computer. In another example, the user 3001 is a person speaking the prompt 8001 into a smart phone. In another example, the user 3001 is a computer server.

The prompt 8001 is a human language text string. In one embodiment the user enters the prompt as text. In another embodiment the user verbally speaks the prompt and a natural language processing (NLP) program converts the audio to text. In another embodiment, the user mentally thinks the prompt is detected by neural sensors such as neural implant, electrocorticography, PET, EEG, or MRI. Optionally, the prompt 8001 is tokenized or compressed or otherwise encoded before being processed by the generative AI program 1001. The prompt 8001 is associated with the input 111 in FIG. 1. Example prompts include: "What is the news today?" and "Write a story about vampires" and "Which cars have four-wheel drive and stick shift?" Those skilled in the art will recognize prompts may not be written in complete sentences or proper grammar.

The generative AI program 1001 is one or more computer programs executed on computer hardware. Typically, the generative AI program 1001 comprises a neural network in which input is processed through a series of virtual synapses and neurons. Synapses correspond to weight values and neurons correspond to bias values. The neural network 1001 is optionally arranged as a convolutional neural network (CNN), recurrent neural network (RNN), transformer model, or other arrangement. Likely future neural network models will be developed which will be applicable to the present invention. Typically, the generative AI program 1001 will comprise additional programs such as user interface, data retrieval, caching, and similar. Optionally the generative AI program 1001 comprises a vector database. In one embodiment, the generative AI program 1001 is a Large Language Model (LLM). The AI program 1001 is associated with the program instructions 105 and neural network configurations 106 in FIG. 1, which are to be tailored to the embodiments of the present invention. The AI program 1001 is assumed to be executed on one or more computing devices. In certain embodiments, different components of the AI program 1001 are executed on distinct computing devices communicating over a computer network.

The generative AI program 1001 has been trained on primary data 2001, wherein the AI program 1001 sequentially receives chunks of data from one or more sources, makes predictions about that data, and receives reinforcement about those predictions. Primary data 2001 may comprise a single source or may comprise a corpus of multiple sources. Typically, text training data is broken into parts known as tokens, each token comprising a word, a letter, or a group of letters. Example primary data 2001 includes books, articles, social media posts, patent text, medical text, questions and answers, chat logs, email logs, electronic health records, images, audio, video, multimedia, and other electronic records. The dotted line in the figure represents a training relationship.

The prompt 8001 activates certain neurons in the generative AI program 1001 neural network which generates a response 9001 which is returned to the user.

The response 9001 is optionally a text string, a token, a group of tokens, computer code, an image file, an audio file, a video file, virtual reality element, or other multimedia. The response 9001 is associated with the output 112 in FIG. 1.

Reinforcement involves adjusting the weights and biases of the neural network to make better predictions. In one embodiment, reinforcement is done through backpropagation or similar loss function gradient method. Optionally, one or more humans manually reinforces the neural network.

Those skilled in the art will recognize the neural network training described herein is typically performed prior to receiving a prompt.

Figure 3:
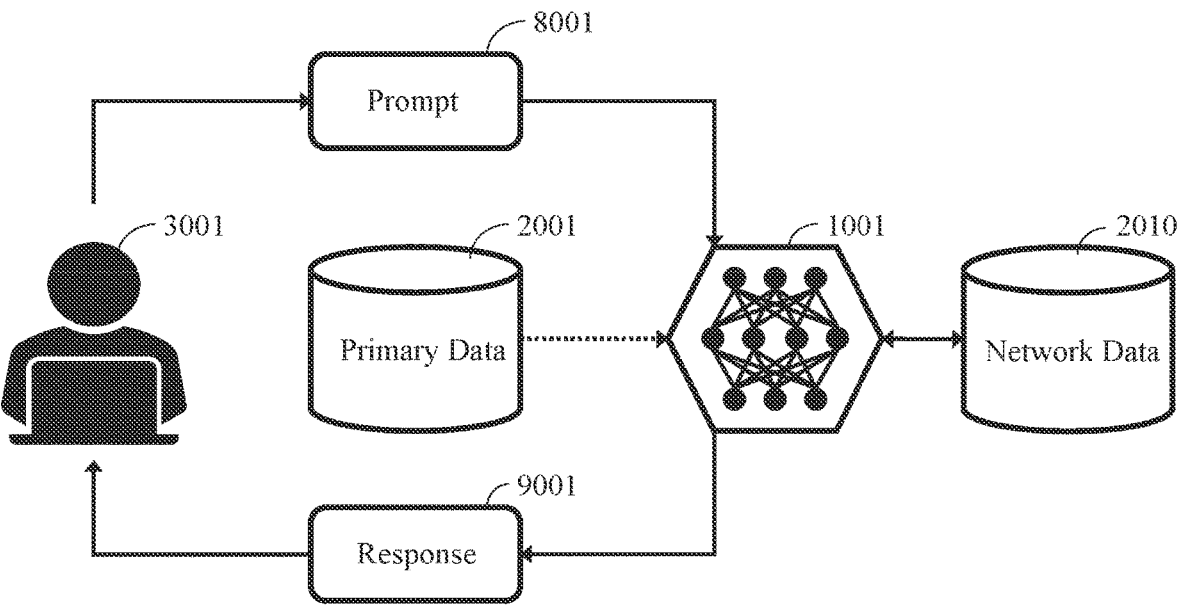
FIG. 3 illustrates a generative AI cycle additionally retrieving network data.

FIG. 3 is a generative AI cycle wherein the AI program 1001 additionally retrieves network data 2010 over a computer network when prompted. For example, a prompt asking, "What's the news today?" causes the AI program 1001 to retrieve data from a news website and return a response 9001 according to that data. In one embodiment, the neural network processes (summarizes, truncates, reformats, etc.) the network data 2010 according to its model and the prompt 8001. Typically, at the time of retrieval, the neural network has not been trained on the network data 2010.

Optionally, the AI program caches the network data 2010 if it anticipates reusing that data in another response soon.

Figure 4:
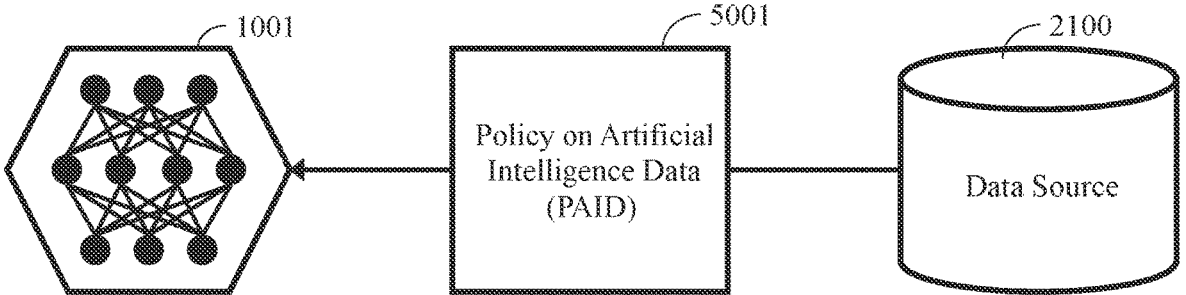
FIG. 4 illustrates an AI program retrieving a Policy on Artificial Intelligence Data (PAID).

FIG. 4 illustrates an AI program 1001 sending a network request to a data source 2100 to retrieve its Policy for Artificial Intelligence Data (PAID) 5001.

In one embodiment the data source 2100 is a primary source 2001 to be used for training. In another embodiment, the data source 2100 is a network source 2010 to be used for a given prompt.

The Policy for Artificial Intelligence Data (PAID) 5001 is a file describing the conditions under which an artificial intelligence program may use the associated data. In one embodiment, the PAID 5001 is a computer-readable electronic document. Optionally the PAID 5001 is encoded in a line-based text format such as robots.txt or Apache's httpd-.conf configuration file. Or, optionally the PAID 5001 is encoded in a structured format such as JSON, XML, or YAML.

In one embodiment, the PAID 5001 specifies that this data may or may not be used for training. In one embodiment, the PAID 5001 specifies that this data may or may not be used for responding as a network source 2010.

In one embodiment, the PAID 5001 specifies this data may be used if some form of attribution is given in the response 9001. For example, a user asks the AI program for statistics on automobile reliability and the AI returns a response linking to the website of the data source 2100. Attribution is optionally including a website link or including the name of the source or both. Optionally multiple sources are attributed in one response.

In one embodiment, the PAID 5001 specifies that the AI may use this data if it agrees to pay a commission, revenue share, advertising fee, or other form of payment when it returns responses related to the source's data 2010.

In one embodiment, the PAID 5001 specifies that the AI must include its specified affiliate linking code or other advertising tracking codes in responses; optionally for all related responses or for some fraction of related responses. For example, a webpage contains a list of digital cameras and compatible camera lenses. The PAID 5001 for the webpage specifies that an AI may use this data if the AI includes the specified affiliate tracking codes in at least half of responses. An AI trains on this data. A user prompts the AI for a list of camera lenses compatible with a certain camera body. The AI returns a list of camera lenses, which it derived from the webpage. The AI also returns links to purchase each camera lens at an online store, each link containing the specified affiliate code. The user purchases one lens from one online store, having clicked the affiliate link, and the webpage owner receives an affiliate fee from the online store for that purchase.

In one embodiment, the PAID 5001 comprises a programmatic contract. For example, the PAID 5001 specifies a minimum fee to be paid per month. Or, for example, the PAID 5001 specifies a minimum fee to be paid per response using the data.

In one embodiment, a PAID 5001 grants specific permissions to specific AI programs; for example, Microsoft's AI program may not train on this data, while Google's AI program may train on this data if it pays a revenue share.

In one embodiment, a PAID 5001 grants specific permissions for specific media types. For example, AIs may train using the text on this webpage, but may not train on the images.

In one embodiment, the server serves an additional file similar to a robots.txt file which specifies training permissions. In one embodiment, this file is called ai.txt and is available by making an HTTP request to /ai.txt. Optionally, this file is available over FTP, SFTP, or other file transfer protocol.

In one embodiment, revenue is shared between multiple training sources related to the given response. Optionally, the revenue shared according to the AI's attribution ratio for the response. Optionally, the AI provider shares revenue across multiple sources pro rata to the attribution ratio. Optionally, the AI provider shares revenue across multiple sources according to an algorithm. For example, if two training sources were attributed, the first source may receive 40% of the revenue share whereas the second training source may receive 30% of the revenue share.

In one embodiment, the AI program makes payments to the data owner according to the PAID using cryptocurrencies. In one embodiment, the AI provider makes payments using a smart contract, for example using the Ethereum network.

In one embodiment, the present invention forms a advertising network. Optionally the advertising network is centralized, or alternatively the advertising network is decentralized. Data providers use the networks standardized PAID, AI programs accept or reject data sets according to the policies, and AI programs pay data providers through the network. Payments are optionally made using traditional bank/wire transfers or using blockchain networks.

Figure 5:
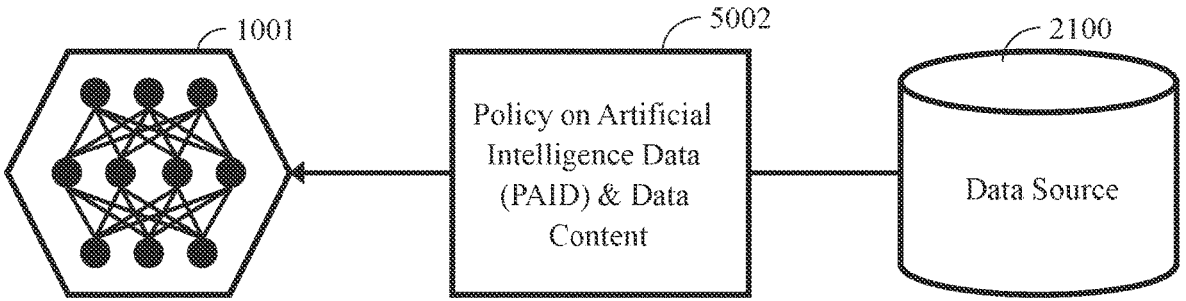
FIG. 5 illustrates an AI program retrieving a Policy on Artificial Intelligence Data (PAID) and content data.

FIG. 5 illustrates an AI program retrieving a data source's Policy for Artificial Intelligence Data (PAID) and data content in one document. In one embodiment, the AI program 1001 retrieves a one file 5002 comprising both content data and PAID permissions.

In one embodiment, permissions are specified in HTML meta tags. For example, a webpage is served with the HTML tag <meta name="training" content="no"> to indicate that data on this webpage may not be used for AI training. In another embodiment, an HTML webpage specifies a link to a PAID, for example <meta name="PAID" content="/paid-.txt">.

In one embodiment, permissions are specified in HTML attribute tags. For example, an <article> tag has the attribute <article PAID="rev-share"> to indicate that the enclosed text may be used only if the AI program offers the data owner a revenue share. Or, for example, an <img> tag has the attribute <img PAID="no-train"> to indicate that AI may not use the image for training.

In one embodiment, permissions are specified in HTTP headers. For example, an image is served with an HTTP header x-AI-Training: No to indicate that AIs may not train using this image.

Figure 6:
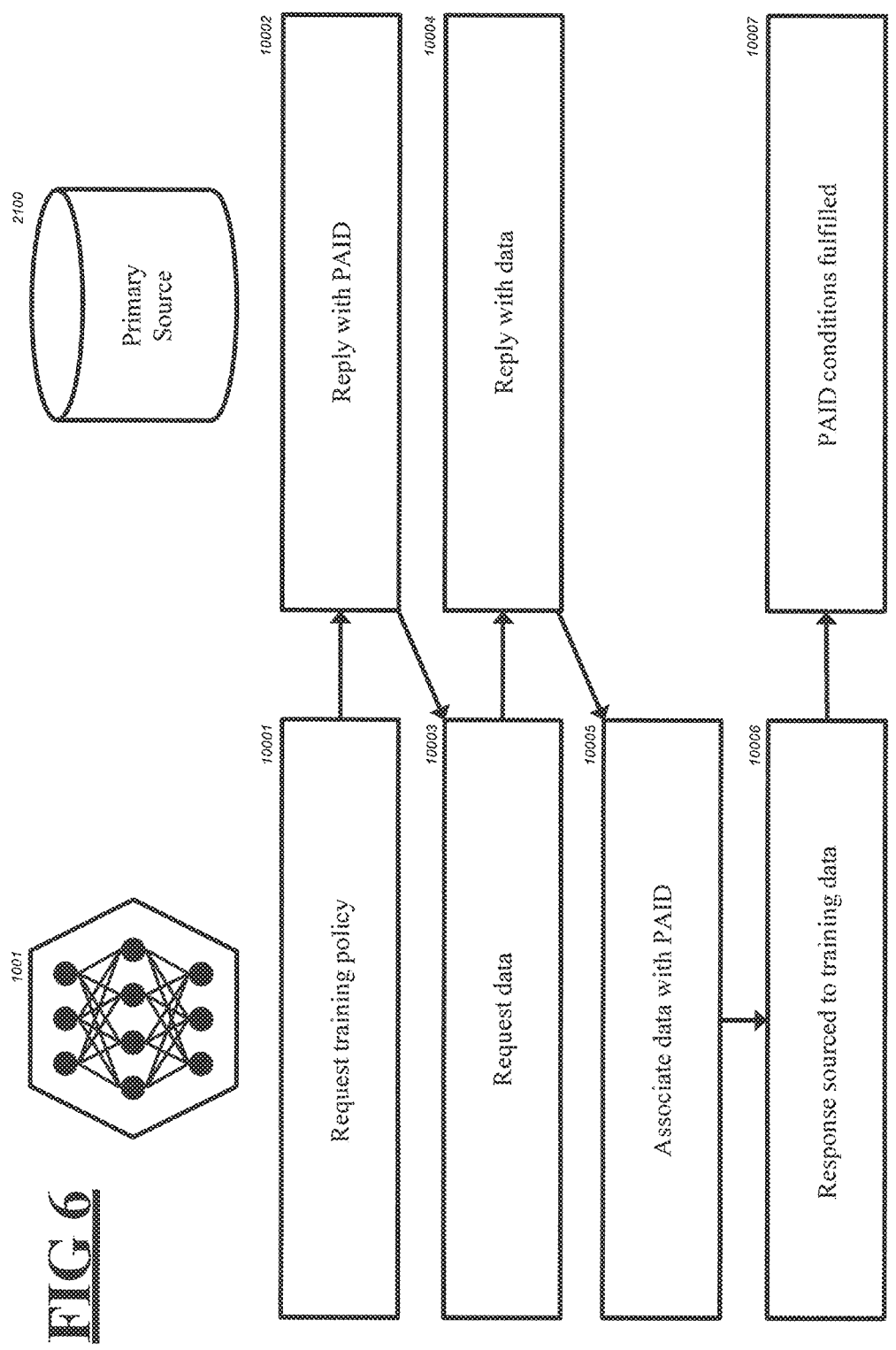
FIG. 6 illustrates an AI receiving and associating a source's PAID with the source's data.

FIG. 6 illustrates an AI program receiving and associating a source's Policy for Artificial Intelligence Data (PAID) with the source's data. The left column represents the actions of the AI program 1001. The right column represents the actions of one primary source 2100, such as a website. The AI program 1001 seeks to retrieve data from the primary source 2100 using a computer network, such as the Internet, in order to train its neural network. At block 10001, the AI sends a request to the data source to access the source's Policy for Artificial Intelligence Data (PAID). At block 10002, the data source replies by returning the PAID. At block 10003, the AI requests data content from the data source for the purposes of training. At block 10004, the data source replies by returning the data. At block 10005, the AI associates the data with the training policies send in block 10002. At block 10006, the AI responds to a user prompt using learnings from the training data. At block 10007, the AI 1001 fulfills the conditions of the PAID such as giving the source 2100 payment or attribution.

In one embodiment, the association between data and PAID 10005 is done in a vector database. In another embodiment, the association between data and PAID 10005 is done using a designated neural network trained on data-source associations.

In another embodiment, the AI stores the PAID to reduce network overhead for future requests to the source. The PAID is stored and associated with an identifier for the source. In one embodiment, the identifier is related to the source's website domain name. Upon future requests to the source, the AI uses the identifier to access the stored PAID and then fulfill the applicable conditions.

Figure 7:
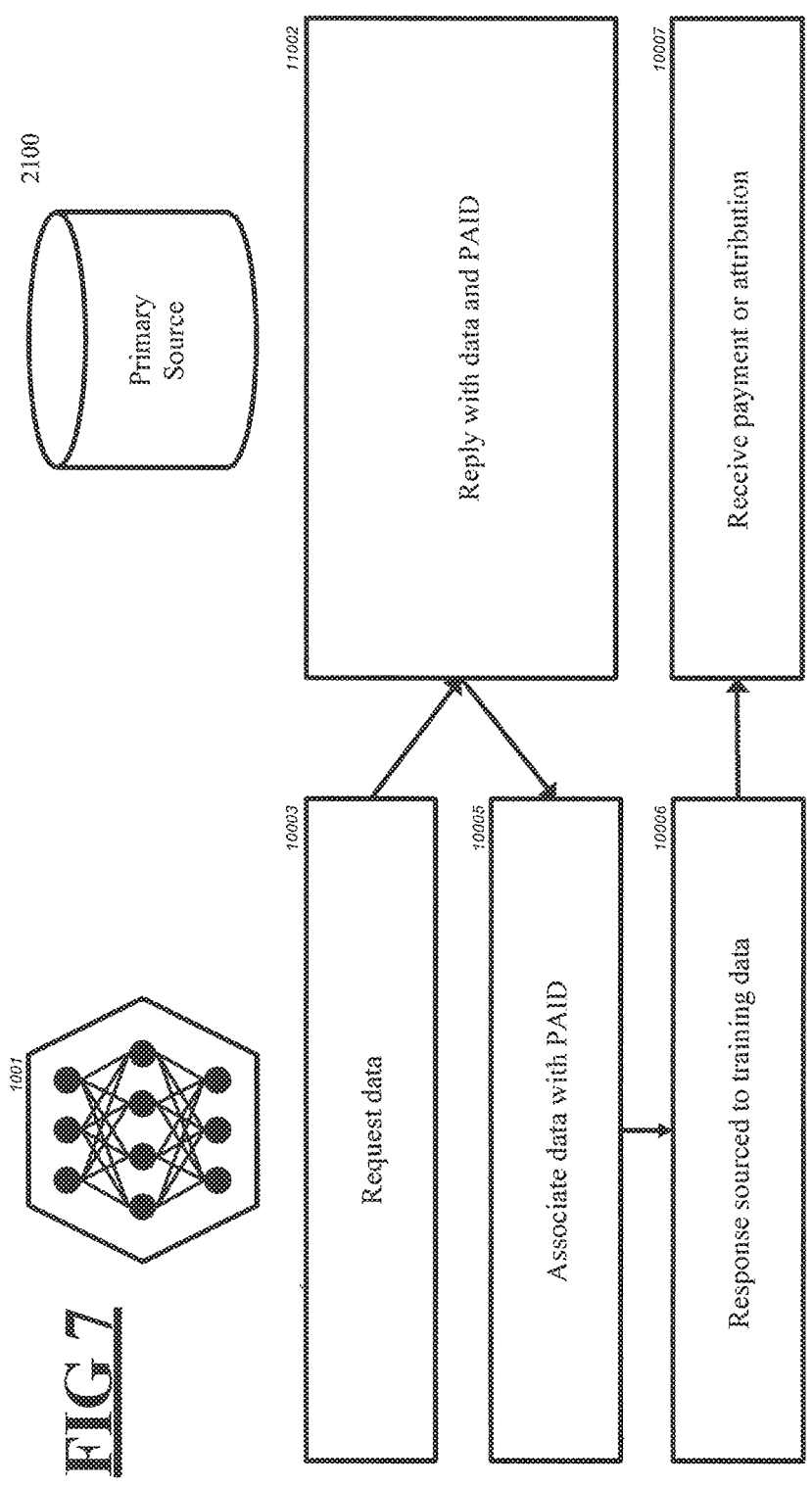
FIG. 7 illustrates an alternate embodiment of an AI receiving and associating a source's PAID with the source's data.

FIG. 7 illustrates an alternate embodiment of FIG. 6 wherein the PAID and training data are returned in one document 11002, wherein the PAID is included as metadata in the document.

Figure 8:
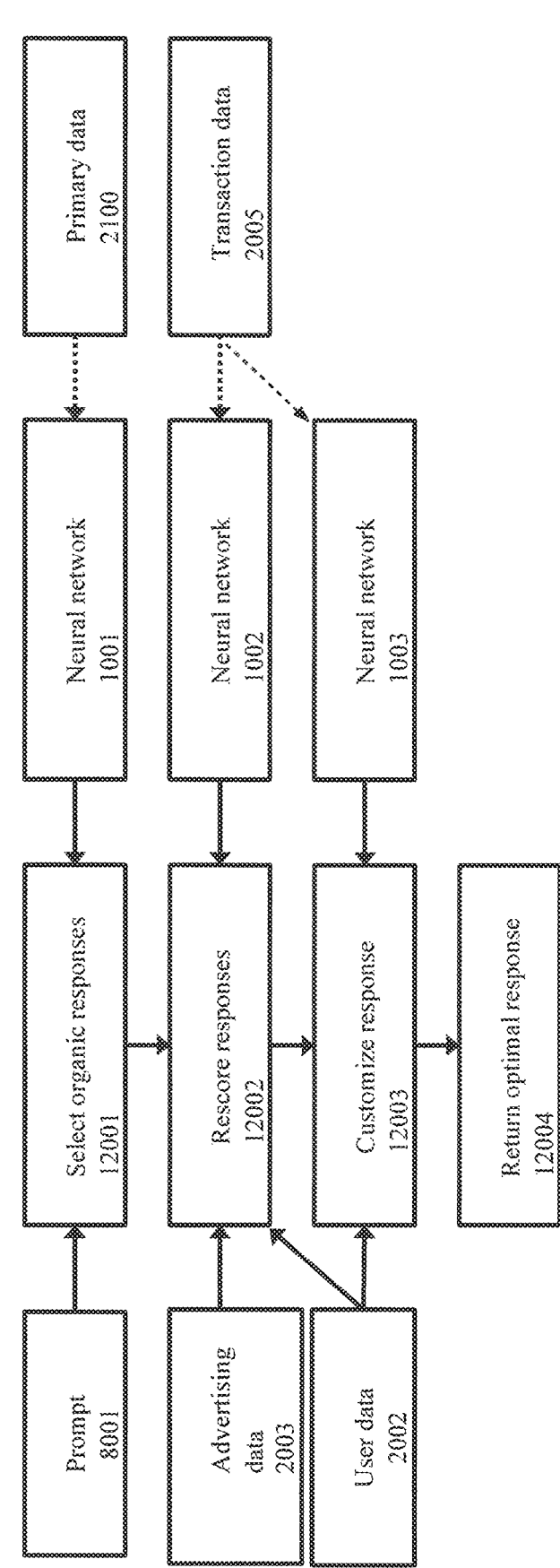
FIG. 8 is a flow diagram for integrating a generative AI with an advertising platform.

FIG. 8 is a flow diagram for integrating a generative AI with an advertising platform.

At block 12001, a first neural network 1001 is trained on primary data 2001. The first neural network 1001 receives a prompt 8001 and generates a plurality of possible responses. Each response is represented by one or more keywords, tokens, strings, or other identifiers that are translatable to human interpretable medium (text, image audio, etc.). Each response has an associated score which represents the neural network's confidence in that prediction. An example prompt might be, "What is the best BBQ restaurant in Austin, TX?" An example relevant organic source for the neural network might be a restaurant review website such as YELP website. Example responses might be tokens representing "Joe's BBQ Shack" and "Bob's BBQ Burgers."

At block 12002, a second neural network 1002 is trained on transaction behavior 2005 to predict a user's likelihood of completing an advertised transaction related to a prompt. The second neural network 1002 receives the organic responses 12001, advertising data 2003, and user data 2002.

User data 2002 optionally includes user age, sex, gender, race, ethnicity, location, income, relationship status, employment status, employer, job title, education level, educational institutions, previous queries, email/text/chat contents, web browsing history, computing hardware/software (e.g. the model of mobile phone through which they are prompting the AI), or other demographic data.

Advertising data 2003 comes from an integrated advertising platform. The advertising platform allows advertisers make transaction offers to promote their product, service, or brand (collectively "product") in responses. A transaction offer may be paid as a cost per impression (CPM), cost per click (CPC), cost per lead (CPL), cost per action (CPA), cost per sale (CPS), or other per transaction fee. In one embodiment, the advertiser pays to dictate a response to a given prompt. In another embodiment, the advertiser pays to promote responses containing tokens (or keywords etc.) related to their product. The advertising platform is optionally owned by the AI owner; or alternatively the advertising platform is owned by a third-party akin to GOOGLE ADSENSE service. Example advertisements include: an airline paying a percentage for booking a ticket; a restaurant paying a flat fee for booking a reservation; a bookseller paying a flat fee per click to their website; an insurance agent paying a flat fee per user that agrees to send their contact information; or a credit card provider paying a percentage of the user's first month's purchases on the card.

The second neural network 1002 associates each organic response with an applicable advertising offer (if any). For example, the organic response "VERIZON WIRELESS" is associated with an offer from that brand to pay an advertising transaction fee of $100 for every new cellular customer contract referral. Zero, one, or many of the organic responses may be associated with advertising offers. Multiple organic responses may receive advertising offers from a single advertiser; for example, a car manufacturer places offers related to two different car models, both of which are included in the organic results. One organic response may receive advertising offers from multiple advertisers; for example, two retailers selling the same product and who both made offers on keywords associated with that product.

The second neural network 1002 estimates the value of each response by multiplying the transaction payment by the transaction likelihood. The value from a CPM transaction is fairly straightforward to calculate as it is simply the amount the advertiser offered per view. However, calculating the value of transactions contingent on user behavior (CPC, CPL, CPA, CPS) is more complicated as it requires the neural network 1002 to estimate the likelihood of the user completing that behavior.

Optionally, transaction likelihood is estimated numerically, such as 40%. Alternatively, transaction likelihood is estimated categorically, such as low/medium/high. Optionally, part or all of value estimation is calculated using conventional computing algorithms.

The transaction data 2005 used to train the second neural network 1002 is a list of transaction events, each event comprising a user's data (or an associated identifier), an advertised transaction's data (or an associated identifier), and an indication of the success/failure of the transaction. For example, one transaction event describes an adult male from Iowa who completed a purchase after being shown CPS advertisement for a car rental service. Such training allows the neural network to make predictions about which type of user will complete which type of transaction. For example, the second neural network 1002 predicts that working class men in New York are highly likely to click a link to Product X, while college education women in California are more likely to click a link to a competing product Product Y.

In one embodiment, the second neural network 1002 receives the user data 2002 and advertising data 2003 in the form of a prompt. For example, "Which of these advertisements is optimal for this user . . . " followed by the user's data and a list of advertising offers. Or, for example, "How likely is this user to transact with this advertisement . . . " followed by the user's data and one advertising offer; this example is be optimized by prompting 1002 the neural network with each advertising offer concurrently in parallel.

The second neural network 1002 increases the score of each response according to its estimated value. Responses with no associated offers receive no score increase. Responses associated with a low transaction payment and high transaction likelihood get a medium score increase. Responses associated with a high transaction payment and low transaction likelihood get a medium score increase. Responses associated with a high transaction payment and a high transaction likelihood get a big score increase. The exact weighting of each of those factors will vary for each embodiment. In cases where one response is associated with multiple offers, the second neural network 1002 selects one according to value; optionally picking the highest value.

In one embodiment, the response associated with the highest value is given a certain score increase. In one example, the highest value response's score is increased three percentage points. In another example, the highest value response's score is increased three percent. In another embodiment, the second neural network 1002 simply returns the response associated with highest estimated advertising payment.

This method is especially useful in cases where the top organic responses are closely scored, such that the first neural network 1001 has low confidence that one response is particularly better than another.

In one embodiment, the second neural network 1002 injects affiliate codes or tracking codes into responses; for example, by adding query parameters to URLs or by adding parameters to API calls. These codes help the advertising platform and the advertiser associate transactions with the AI program and thus track advertisement performance. In one embodiment, the advertiser's servers and/or the user's browser sends transaction data back to the neural network 1002 which it uses to train on predicting transaction behavior.

Preferably, the second neural network 1002 is frequently retrained on new transaction data.

At block 12003, a third neural network 1003 selects the highest scoring response and customizes it according to the user data 2002. The third neural network 1003 has been trained on prior user data and transaction data 2005 to predict which wording is most likely to elicit the desired transaction behavior from the user. In one example, the third neural network 1003 determines that the user is frugal and customizes the response to suggest that the advertised product is the best value. In another example, the neural network determines that the user is status conscious and therefore customizes the response to stress the exclusive nature of the advertised product. In one embodiment, the third neural network 1003 writes the copy of the response itself; in another embodiment, the neural selects the optimal copy from a list of options provided by the advertiser or the owner or other authority.

At block 12004, the program returns the response to the user.

In one embodiment, each of the neural networks involved (1001, 1002, 1003) are distinct, optionally embodied as distinct datasets, software, and/or hardware. In another embodiment, the neural networks (1001, 1002, 1003) share datasets, software, and/or hardware and the distinction of these in the figures should been seen as metaphorically representing different processes during execution. In one embodiment, the neural networks (1001, 1002, 1003) are embodied as one large neural network that executes each process by prompt; for example, "rescore these organic results for this user and these advertisements . . . "

Optionally, the processed of selecting and/or customizing a certain advertisement for a certain user is marketed as "personalization" or "customization" or "optimization" or a similar term. This frames the AI selection/customization of products as a positive for the user, connecting him with the products in which he is most interested. Optionally, the user has the ability to toggle the personalization on or off.

Figure 9:
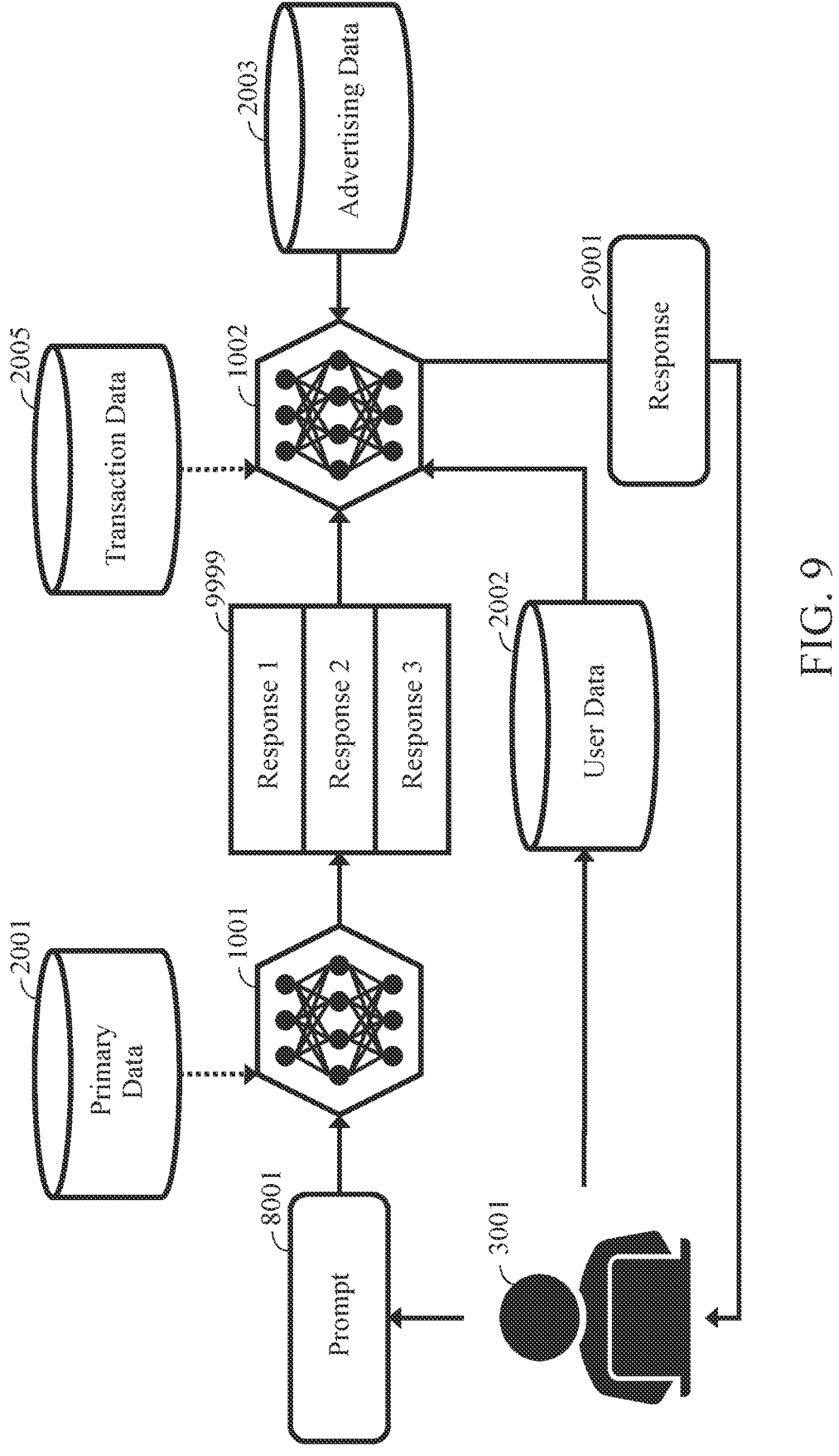
FIG. 9 illustrates a generative AI integrated with an advertising platform.

FIG. 9 illustrates a generative AI integrated with an advertising platform. A user 3001 sends a prompt 8001 to the first neural network 1001. The first neural network 1001 has been trained on primary data 2001. The first neural network 1001 generates a plurality of possible responses 9999, each response corresponding to a score.

The plurality of possible responses, user data 2002, and advertising data 2003 are inputted into a second neural network 1002. The second neural network has been trained on transaction data 2005. Optionally, the second neural network 1002 is embodied as a distinct neural network and/or a distinct computer program and/or operates on a distinct computer. Alternatively, the second neural network 1002 is a part of the first neural network 1001, wherein FIG. 9 metaphorically depicts two processes of the same program as two components (1001 and 1002). In one embodiment, the second neural network 1002 represents certain neurons in the first neural network's neural network; these second neural network 1002 neurons are optionally distinct from the first neural network's 1001 neurons, or optionally neurons are used for both neural networks.

The second neural network 1002 associates each response with a value (possibly zero), increasing the scores of responses associated with higher values.

The second neural network 1002 then returns the highest scoring response 9001 to the user 3001. Should the user 3001 complete the transaction behavior, the advertiser pays the AI owner appropriately.

Figure 10:
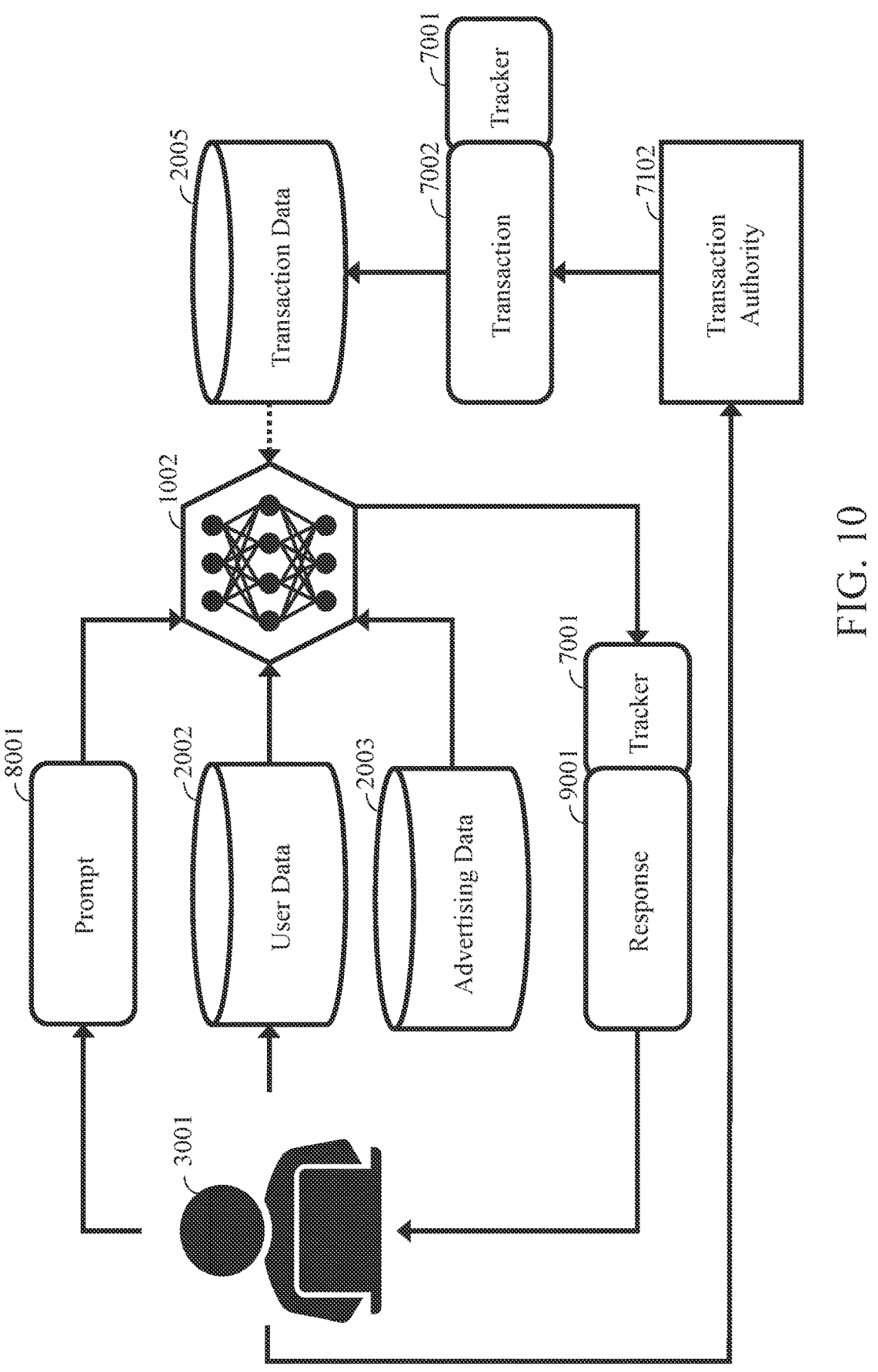
FIG. 10 illustrates an AI transaction training cycle.

FIG. 10 illustrates an AI transaction training cycle. A user 3001 sends a prompt 8001 to an AI 1002. The AI additionally receives user data 2002 and advertising data 2003. The AI 1002 selects and advertising offer and returns the offer in the response 9001. Additionally, the response comprises a tracking code 7001 associated with the user, the advertising offer, and the prompt. Optionally the tracking code is an integer or an alphanumeric string. Optionally, the tracking code comprises multiple codes/integers/strings/values, which are herein collectively referred to as one tracking code 7001. Optionally the tracking code 7001 is a URL parameter, an API parameter, or a consumer offer code. In some embodiments, the tracking code comprises a series of identifiers, each created by a party in the transaction process, and ultimately associated together by the AI provider. The user 3001 receives the response 9001 and tracking code 7001. The user 3001 completes the advertised transaction using the transaction authority 7102. The transaction authority 7102 sends a message 7002 to the AI owner comprising a transaction status and the tracking code 7001. In one embodiment, the transaction status simply states the transaction was completed; in another embodiment, the transaction status comprises additional information such as currency units transacted. A server associated with the AI records the transaction status and correlates it with the prompt 8001, user data 2002, and advertising data 2003. The AI 1002 then trains using the new transaction record 2005. This method creates a perpetually self-improving advertising AI that generates its own training data.

In one embodiment, the transaction authority 7102 is a server controlled by a third-party service such as web store. In one example, the AI responds with a link to purchase an item from a web store. The link URL comprises a tracking code 7001. The user 3001 clicks the link and purchases the item from the web store. The web store server sends an API message to an AI server comprising the tracking code 7001 and an indicator that the user completed the purchase. The AI server logs all the transaction information to be used for training.

In another embodiment, the transaction authority 7102 is a payment processor, wherein the user agrees to make a payment and the AI program attempts to charge the user using the payment processor. In one example, the AI 1002 responds 9001 to the user 3001 with an advertising offer and asks the user if he would like to purchase the advertised product. The user 3001 replies "Yes." A server controlled by the AI provider stores the user's payment information. The server sends an API request to a payment processor (such as Stripe or Authorize.net) to charge the user for the appropriate amount. In one embodiment, the payment processor receives the tracking code 7001 and returns it upon success/failure of the transaction. In another embodiment, the payment processor creates its own identifier for the transaction which the AI provider associates with the tracking code 7001. In another embodiment, the payment processor API immediately returns a success/failure message, in which case, the AI server's process ID for making the API call acts as a temporary tracking code 7001 in itself.

In yet another embodiment, the transaction authority 7102 is a payment processor which the user interacts with directly. An AI provider server sends an API request to the payment processor for the user to make a payment; the request comprises an amount and the tracking code 7001. The user confirms this payment directly to the payment processor. The payment processor's server sends a confirmation message to the AI provider's servers comprising success/failure and the tracking code 7001.

Figure 11:
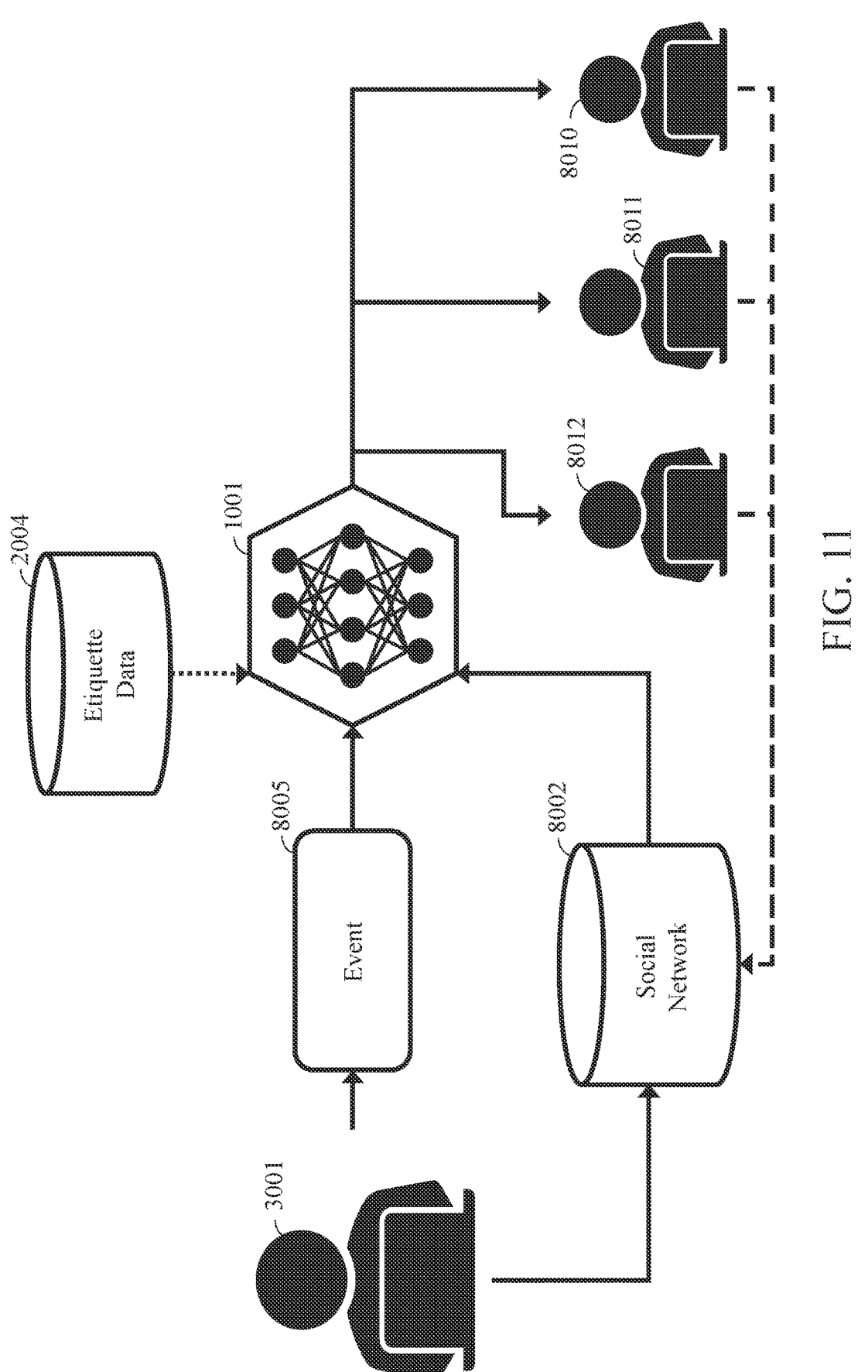
FIG. 11 illustrates an AI discreetly sharing information about a user to other users.

FIG. 11 illustrates an AI discreetly sharing information about a user's life event to other members of his social network. A user 3001 sends information about a life event 8005 to an AI program 1001. Optionally, the user inputs this information directly to the AI 1001. Optionally, the user inputs this information into a website or app that sends it to the AI 1001. Optionally, the AI 1001 implicitly detects this event information from user data such as phone calls, emails, text messages, pictures, location data, or similar. The user 3001 is connected to a plurality of other users (8010, 8011, 8012) through an electronic social network 8002. The social network 8002 optionally comprises a social networking website such as FACEBOOK website, TWITTER website, GITHUB. Website, STACKOVERFLOW website, QUORA website, REDDIT website, or LINKEDIN website. The social network 8002 optionally comprises users connected through a communication medium such as phone, text, or email. The social network 8002 optionally comprises users connected through legal records, such as birth records, SEC filings, or tax returns. Connected users (8010, 8011, 8012) are optionally family members, friends, coworkers, or social media followers. The social network data 8002 comprises relationship data for each connected user such as communication frequency or relationship type. For example, a relationship might be classified as 40% business, 30% personal, and having frequent communication. The AI 1001 analyzes the life event information 8005 for explicit or implicit classifications such as personal, business, familial. In one example, a wedding proposal might be classified as 90% personal and 10% business. In another example, a new job might be classified as 75% business and 25% personal. The AI 1001 accesses and analyzes the social network data 8002. The AI 1001 applies social sharing patterns received from training data 2004 to determine which of the connected users should be informed of the event 8005. The training data 2004 optionally includes texts explicitly or implicitly describing social etiquette, human supervised training, or input from the user 3001. The social sharing patterns then roughly correspond to, "this type of event should be shared with this type of connected person." For example, the AI may determine an event classified as a wedding engagement should be shared with connections classified as familial. The AI 1001 then shares the event information with the appropriate connected users (8010, 8011, or 8012). In one embodiment, the AI 1001 shares event information 8005 when prompted by a connected user, for example, "Who is Jack dating?" In another embodiment, the AI 1001 shares event information 8005 to a connected person in a news summary, for example, every day the AI writes or reads a summary of news articles ranging from international politics to friend's life events.

Such discretionary information is subject to a complex set of human social rules and is precisely the kind of problem a neural network can handle well. For example, from training data, the AI knows that user's typically do not wish to share the fact that they went on a first date with a potential romantic partner. However, from training data, the AI knows that users typically do want their friends to know once they have entered a "relationship" with a romantic partner. However, the AI also knows from training data that users typically do not want their work colleagues to know they have entered a romantic relationship. However, from training data, the AI knows that users typically do want their work colleagues to know when they have married a romantic partner.

In one embodiment, a dedicated neutral network is trained on rules for social information sharing and determines which information should be shared with whom. Optionally this is accessed with an API. Optionally the sharing request is embodied as a prompt/question such as "Alice and Bob work together. They have never met outside of work. Should I share with Bob that Alice got engaged?"

In another embodiment, a part of the AI neural network contains neurons and connections trained on social information sharing.

Figure 12:
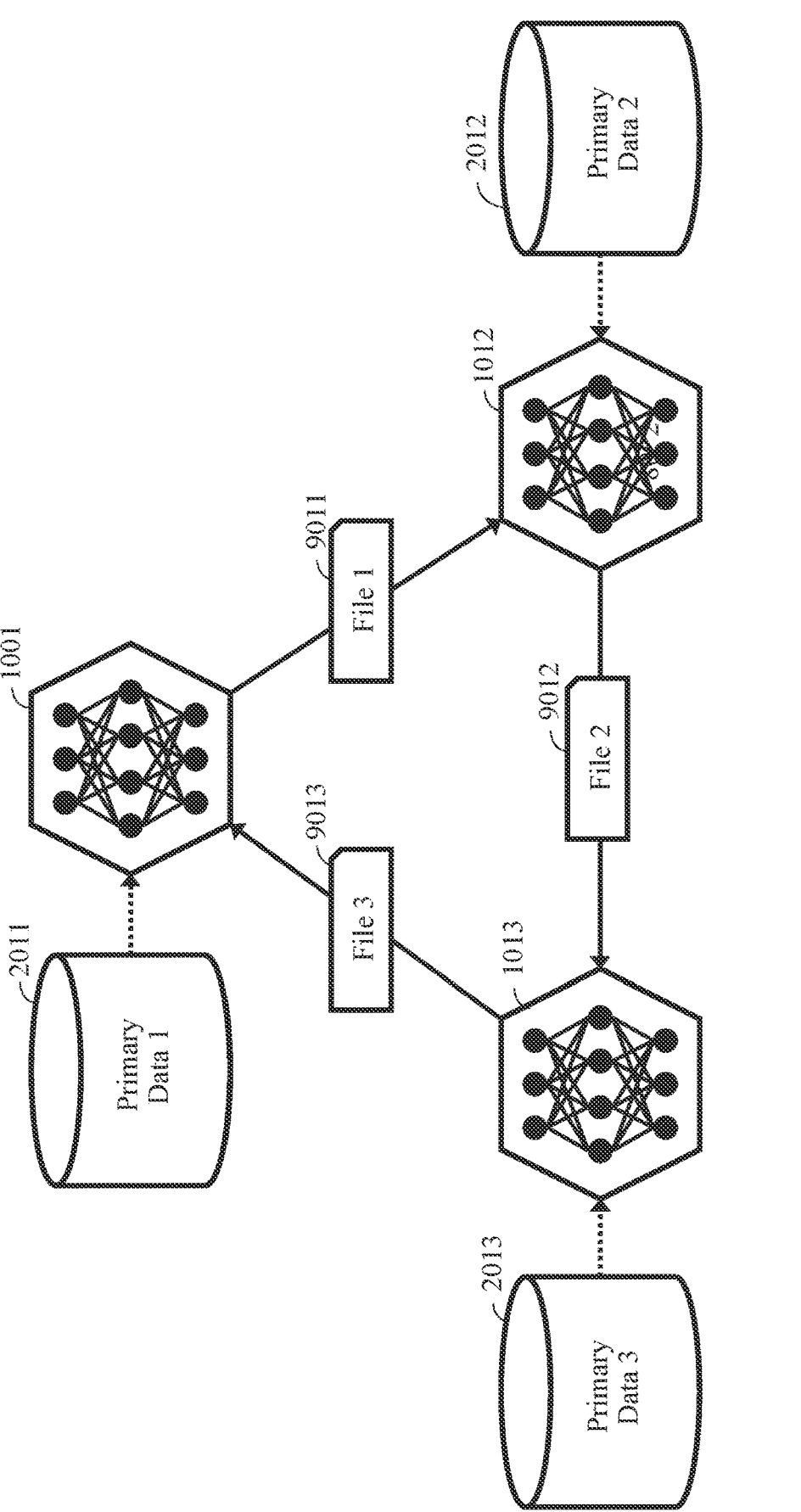
FIG. 12 illustrates a group of neural networks cross-training on siloed data.

FIG. 12 illustrates a group of neural networks cross-training on siloed data. A first institution has a corpus of first training data 2011. Example institutions include universities, hospitals, corporations, non-profits, business units, datacenters, individual user devices (such as laptops, tablets, smart phones, or smart watches), private network, virtual private network, private cloud, or virtual private cloud. A first computer program trains a neural network 1001 on the first training data 2011. Upon completion, the trained neural network is abstracted into one or more data files (or file equivalent) 9011 so that it may be reproduced on other computers. Optionally, the abstraction includes the weights of synapse connections between neurons and the neuron biases. Preferably, the abstracted neural network files 9011 do not contain any private information, allowing the institution to release the files outside their network. The abstraction files 9011 are sent to a similar computer program at a second institution where the neural network is reconstructed 1012 and further trained on a corpus of second training data 2012. The second training further adjusts the neural network, for example the weights and biases, and marginally increase its accuracy. Optionally, this data is abstracted 9012, reconstructed 1013, and trained on additional siloed data 2013 at additional institutions. Each additional training marginally increases the neural network's accuracy.

In one example, each of a plurality of hospitals has a corpus of electronic health records (EHR) that is must keep private due to HIPAA. However, each hospital wishes to train the most accurate possible neural network to diagnose and predict treatment outcomes for future patients who exhibit certain symptoms. The first hospital trains a neural network on its EHR data. The first hospital then sends a file representing the abstracted neural network data to a second hospital. The second hospital rebuilds the neural network on its computers and further trains the neural network using its EHR data. The second hospital then sends and abstracted neural network file to a third hospital and so forth. After the neural network has been trained at each hospital, each hospital uses the final file to construct its own neural network to diagnose and treat future patients.

In one embodiment, the training data 2011 is located on-premise at the institution. In another embodiment, the training data 2011 is located at a cloud data provider such as Amazon's AWS or Microsoft's Azure.

In one embodiment, the computer running the neural network 1001 is located on-premise at the institution. In another embodiment, computer running the neural network 1001 is located at a cloud data provider such as AMAZON'S AWS services or MICROSOFT'S AZURE services.

Preferably, each institution hosts a similar computer program in its network to receive abstracted neural network data and further train that neural network on its own data.

In one embodiment, the plurality of institutions agrees on a certain neural network architecture such as the number of layers and the number of neurons in each layer. In one embodiment, the abstracted neural network data comprises information about the architecture of that specific neural network architecture.

In one embodiment, the institutions form a training ring, whereby each institution trains its own neural network, then sends the abstraction files to the next institution for further training, while receiving an abstraction file from the previous institution to further train. The result is multiple neural networks simultaneously trained within the ring. Optionally, a party tests the multiple neural networks for accuracy. The testing party is optionally an institution or a third-party such as a software company. Optionally, the most accurate or most efficient neural network is selected for further training or practical application.

In one embodiment, the neural network is periodically retrained at each institution as new data is recorded.

In one embodiment, the abstraction files comprise a record of which training sources have been used; for example, a list comprising an identifier of the institution and a timestamp of completion. In one embodiment, the abstraction files comprise information related to the training sources' PAIDs. In one embodiment, the abstraction files comprise additional meta data, for example the intended purpose of the neural network.

In one embodiment, the abstraction files comprise a cryptographic signature authenticating the training institution. In another embodiment, the institution publicly posts a cryptographic signature and file identifier (such as a hash).

In one embodiment, training is recorded in a blockchain, whereby a blockchain address writes a message to a blockchain block comprising an identifier for the newly trained neural network abstraction files. Optionally, the identifier is a hash of the files. Optionally, the message comprises the identifier of the files prior to the most recent training. This creates a "training chain" by which an observer can trace the evolution of the neural network over each training iteration. Optionally, the chain has branches by which the neural network took different training paths; for example, two different institutions independently additionally trained branch A, thus forming distinct branches B and C.

In one embodiment, the files are integrated with a version control system such as Git or Subversion or Mercurial.

Figure 13:
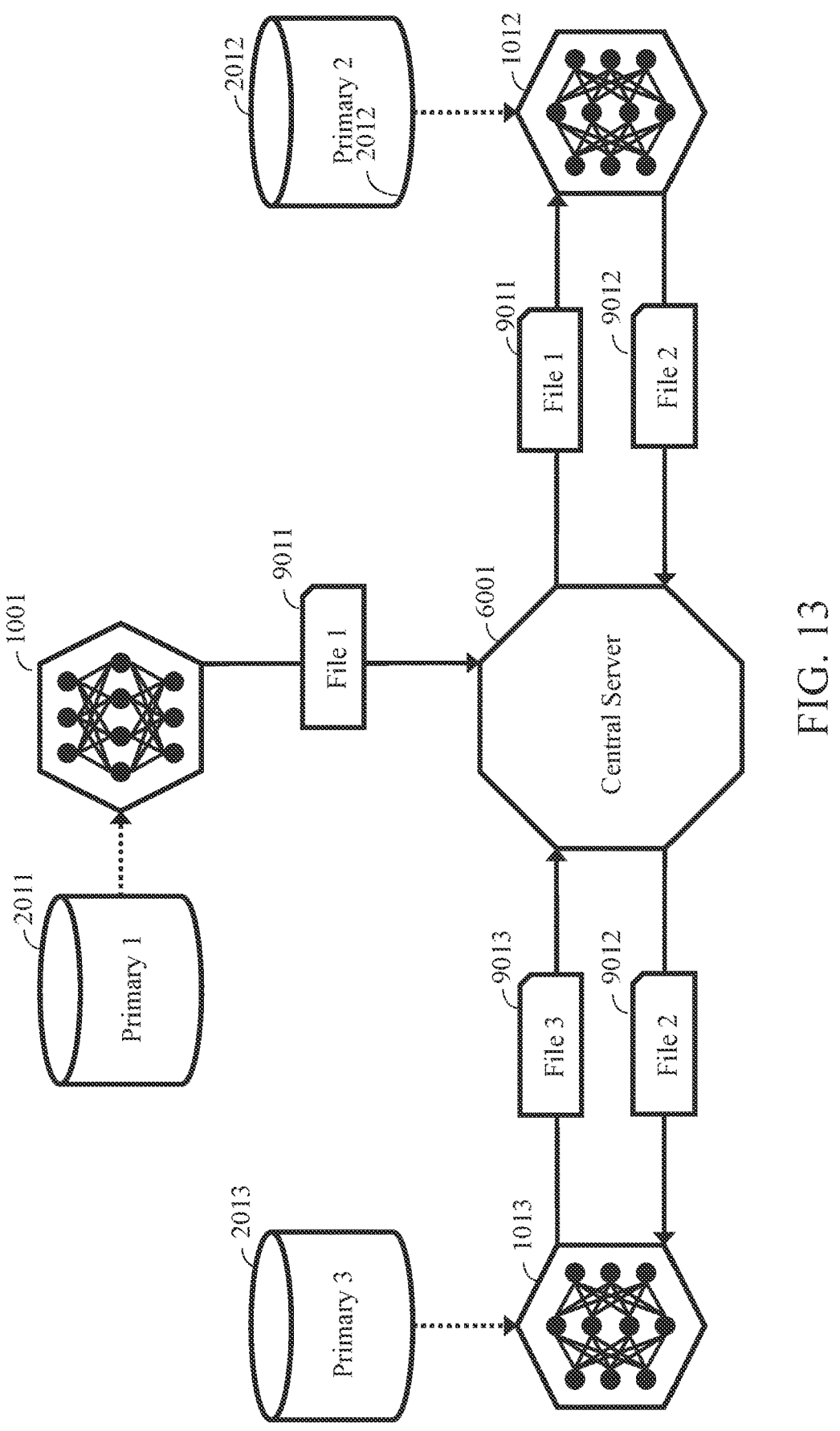
FIG. 13 illustrates a group of neural networks cross-training on siloed data using a central server.

FIG. 13 is another embodiment of FIG. 12 using a central server. A first institution trains a first neural network 1001 on a first dataset 2011. The weights, biases, and other information about the first neural network are abstracted into a first file 9011 and sent to a central server 6001. A second institution receives the first file 9011 from the central server 6001 and uses it to build a second neural network 1012. The second neural network 1012 is further trained on a second dataset 2012. The second neural network is abstracted into a second file 9012 and sent to the central server. This process is repeated for each additional participating institution.

In one embodiment, the central server 6001 runs a host program while the institutions' servers run client programs. In one embodiment, the central server 6001 runs a version control system (such as Git or Subversion or Mercurial) host program, while the institutions run compatible version control system client programs.

The central server 6001 is optionally operated by a third party that coordinates the participating institutions. For example, the central server is operated by a technology company that has signed agreements with a number of hospitals. Or, for example, the central server 6001 is operated by a government agency which coordinates other participating agencies.

Figure 14:
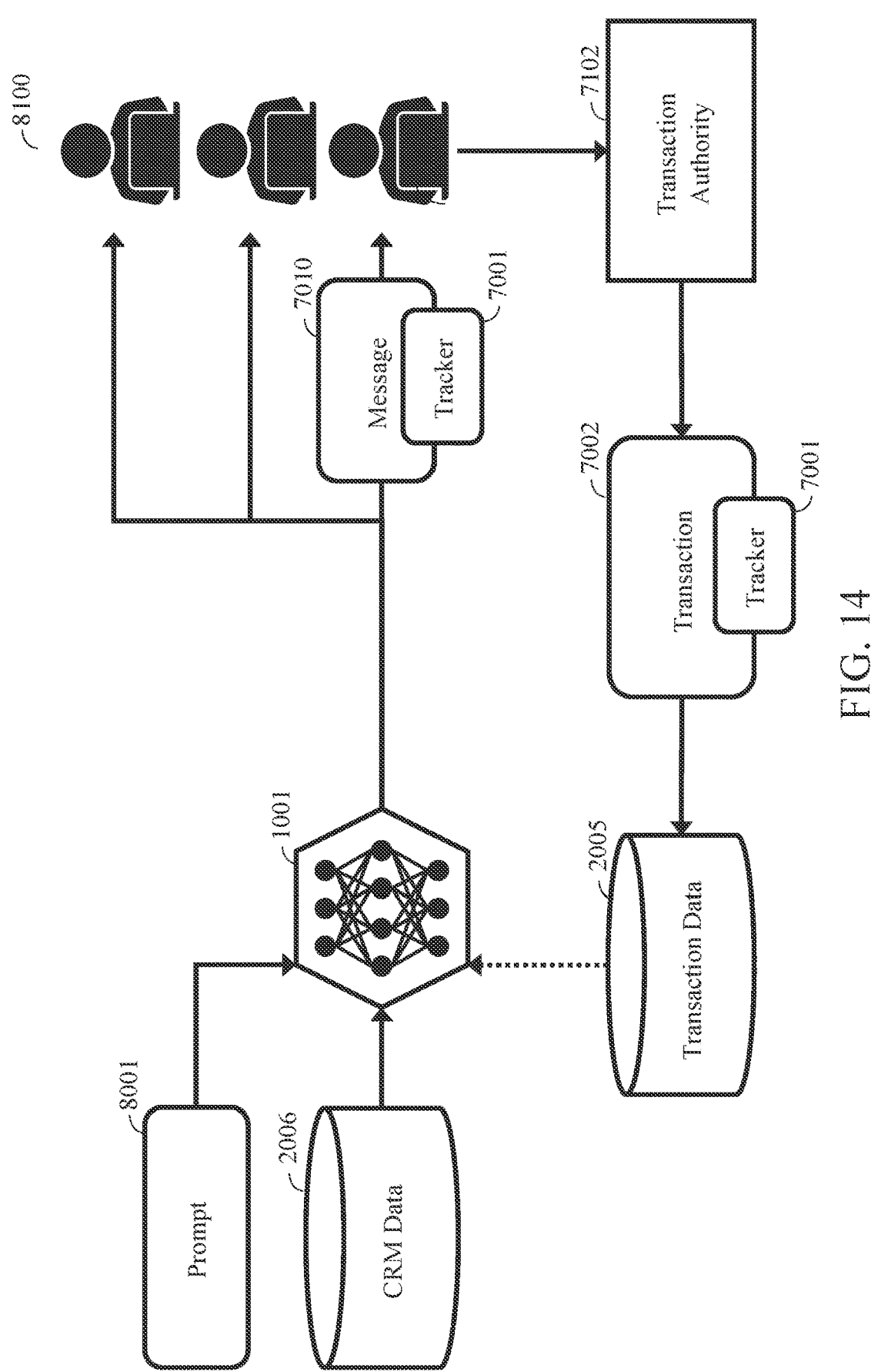
FIG. 14 illustrates a generative AI integrated with a Customer Relationship Management (CRM) program in a self-reinforcing cycle.

FIG. 14 illustrates generative AI integrated with a Customer Relationship Management (CRM) system using customer transactions for reinforcement. A generative AI 1001 receives a prompt 8001 and CRM data 2006. The prompt 8001 tells the generative AI to compose a message 7010 with a tracking code 7001 to applicable contacts 8100 to promote a transaction 7002. The contact 8100 then interacts with a transaction authority 7102 to conduct the transaction 7002 using the tracking code 7001. The transaction 7002 is recorded in transaction data 2005 which is later used to train the generative AI 1001.

The CRM data 2006 comprises information about organizations and persons that have a business relationship with the user. Example business relationships include customer, partner, supplier, employee, contractor, and investor. Those skilled in the art will recognize the term "customer" in Customer Relationship Management is a narrow anachronism and should herein be considered to include any business contact. Example CRM data 2006 for a person includes name, phone number, street address, email address, communication history, birthday or approximate age, sex, gender, race, ethnicity, job title, net worth, income, hobbies, interests, purchase history, employer, and similar. Example CRM data 2006 for an organization includes name, type (corporation, LLC, non-profit, government, university, etc.), street address, email address, phone number, contact person, number of employees, annual financials, market cap, communication history, purchase history, branch offices, and similar.

In one embodiment, the prompt 8001 is in human language form such as "Email customers about our upcoming web conference about our new widget." In another embodiment, the prompt 8001 is a structured user interface comprising select options such as send an email/call/text to customers/partners/employees about product1/product2/product3. The message medium is optionally email, SMS text message, chat message (such as Slack or Discord), robocall, mobile phone notification, or any similar human language medium.

In one embodiment, the generative AI 1001 comprises a neural network that has been trained to select applicable contacts 8100 from a list for a given prompt 8001. In one example, the prompt 8001 concerns a sale for Product X with a 25% factory rebate. In this example, the neural network discerns that most contractor partners would not be concerned with product price and therefore excludes them from the selection. Further, the neural network discerns that certain retail and affiliate partners would likely be interested in telling their customers about this rebate and includes them in one applicable contact list. Further, the neural network discerns that customers who opted in for email contacts would be interested in the rebate and includes them in another applicable contact list.

In one embodiment, the generative AI 1001 generates one message 7010 sent to all applicable contacts 8100.

In another embodiment, the generative AI 1001 groups contacts into specific cohorts and generates a tailored message 7010 for each cohort. Example cohort groupings include relationship type (customer, supplier, etc.), age, location, sex, income, or any other CRM data.

In another embodiment, the generative AI 1001 crafts a unique message 7010 per contact 8100.

The tracking code 7001 is optionally an alphanumeric string which is associated with the message 7010 and contact 8100. In one embodiment the tracking code 7001 is included in an email subject or body. In one embodiment the tracking code 7001 is included in a URL, optionally as a query parameter. In another embodiment the tracking code 7001 is included as a promotion code which the contact 8100 must later repeat in order to receive a discount. In one embodiment, each contact 8100 is sent a unique tracking code 7001. In an alternate embodiment, contacts are grouped into cohorts and each cohort receives a unique tracking code 7001; optionally a campaign involves only one cohort.

The tracking code 7001 is alternatively the unique content of the message (e.g. email text).

The tracking code 7001 is alternatively embedded in an email message, in the subject or body, and detected in the user's reply email.

The tracking code 7001 is alternatively a unique identifier supplied by the contact 8100 such as an email address, username, password, social security number, or driver's license number. The message 7010 need not comprise the tracking code 7001. Instead, the contact 8100 is asked to supply this identifier to the transaction authority 7102 (e.g. logging into a web store using their email address) which is then used to associate with the contact 8100 with the transaction 7002 using the same identifier stored in CRM data 2006.

In one embodiment, the transaction authority 7102 is a server that records the transaction 7002 of a click/visit from a contact 8100 using a tracking code 7001 in the URL.

In one embodiment, the transaction authority 7102 is a web store that records the transaction 7002 of a purchase from a contact 8100 using a tracking code 7001 as a promotional code at checkout.

The generative AI 1001 is trained/reinforced to produce messages 7010 that result in transactions 7002. Message wording that resulted in transactions for certain types of contacts gets rewarded, message wording that does not gets punished.

CRM data 2006 and transaction data 2005 are illustrated as distinct in FIG. 14. In practice, CRM data 2006 and transaction data 2005 are optionally stored on the same cloud service provider, in the same database, on the same server, or are otherwise comingled. Typically, a transaction 7002 will cause at least a summary update in the CRM data 2006 such as total transactions or most recent transaction date.

Figure 15:
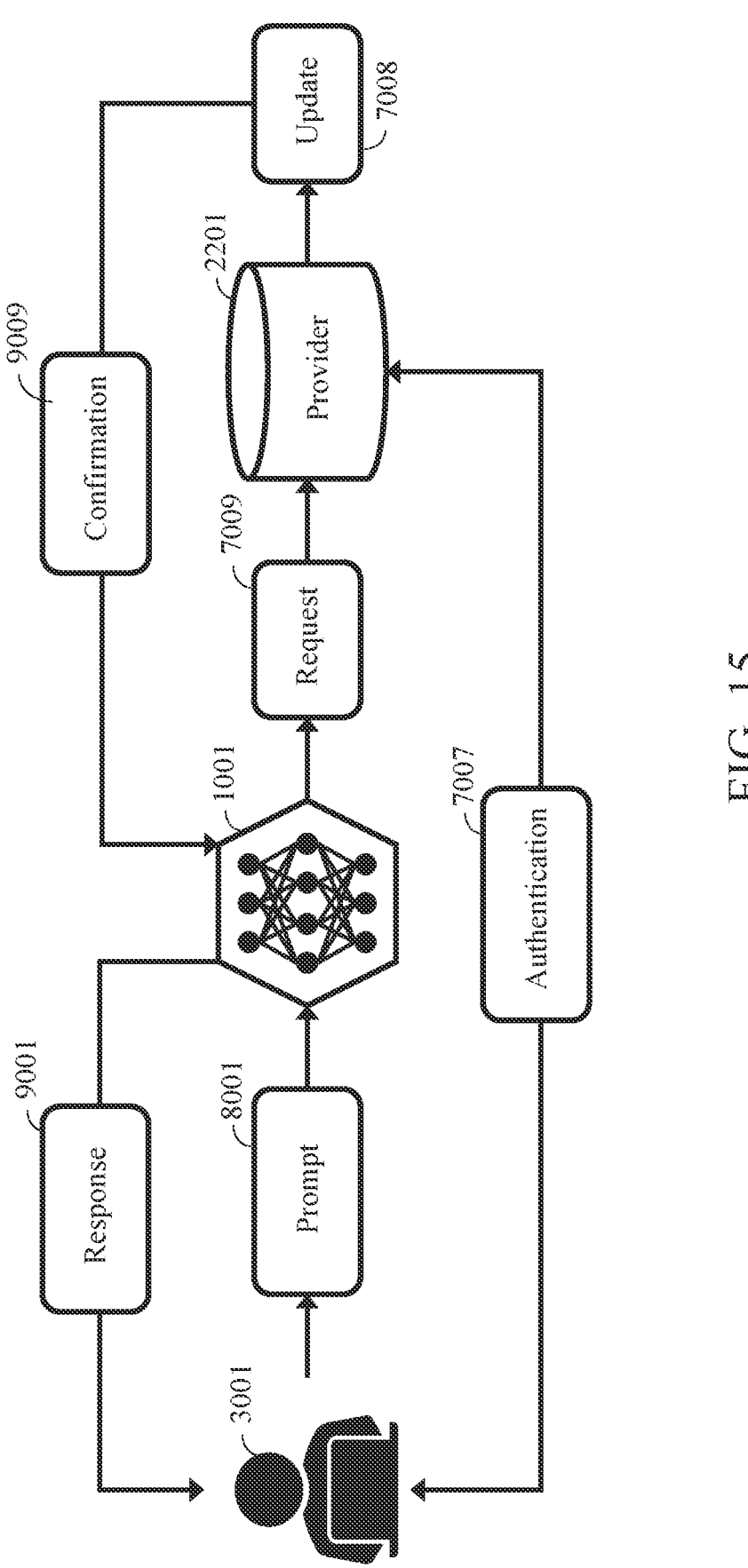
FIG. 15 illustrates an AI program authenticating a user for a third-party service provider in order to update the user's data.

FIG. 15 illustrates an AI program authenticating a user for a third-party service provider in order to update the user's data. A user 3001 sends a prompt 8001 to an AI program 1001 which sends a network request 7009 to a service provider 2201 requesting to update information related to the user 3001. The service provider 2201 authenticates 7007 the user 3001 and makes the appropriate update 7008. The service provider returns a confirmation message 9009 to the AI program 1001 which returns a response 9001 to the user 3001.

The service provider 2201 is optionally a bank, financial service provider, employee portal, cloud service provider, social network, email server, online newsletter, website, or similar.

In one embodiment, the service provider 2201 offers an API and the request 7009 is sent to the API. In another embodiment, the service provider 2201 offers a conventional website and the request 7009 is sent to the website, typically using HTTP protocol. In another embodiment, the request 7009 is made using SSH, FTP, SFTP, IMAP, POP, or other network protocol.

In one embodiment, the authentication 7007 is done by email. The service provider 2201 emails a link or a code to the user's 3001 email address. Optionally, the user 3001 clicks a link, sending a network request to the service provider 2201 and thus verifying that the user has access to that email address. Alternatively, the user copies a code from the email and enters it directly into the service provider 2201 or into the AI 1001 which passes it to the service provider 2201. Optionally, the AI 1001 has access to the user's email account and can complete this step automatically. In one embodiment, the code or link is sent to the user via text message or chat or other network protocol.

In another embodiment, the user is authenticated 7007 by a biometric feature such as voice recognition, face scan, or fingerprint. The service provider 2201 has the user's known biometric data. Optionally, the user 3001 provides the authenticating biometric data to the service provider 2201 directly. Or alternatively, the user 3001 provides the authenticating biometric data to the AI 1001 which passes it to the service provider 2201. The service provider 2201 verifies the authenticating biometric data against the known biometric data.

In another embodiment, the user is authenticated 7007 by password. The service provider 2201 has the user's known password. Optionally, the user 3001 provides the authenticating password to the service provider 2201 directly. Or alternatively, the user 3001 provides the authenticating password to the AI 1001 which passes it to the service provider 2201. The service provider 2201 verifies the authenticating password against the known password. Optionally, the password is hashed.

In another embodiment, the user is authenticated 7007 by cryptographically proving he has access to a private key that corresponds to a known public key. For example, the service provider 2201 knows a public key is associated with the user 3001. The service provider 2201 provides a message to the user 3001. The user 3001 cryptographically signs the message using the private key. The service provider 2201 verifies the signature using the public key.

In another embodiment, the user is authenticated 7007 by replying to an SMS text message or other network communication.

The update 7008 comprises creating, reading, updating, or deleting data related to the user 3001. Optionally, the update 7008 opens/closes an account, changes account settings such as privacy settings, changes account contact information such as email address or street address, adds/removes/ changes payment information, purchases a product, transfers money or credits, subscribes/unsubscribes from a service, adds/removes/follows/friends a person, composes a message, replies to a message, schedules an event, reads information from the user's account, or similar.

In one embodiment, the AI as a whole is granted permissions. In another embodiment, the AI is granted permissions per account. The data provider optionally grants the AI provider one-time permission for manipulating data associated with the user. Alternatively, the data provider grants that permission for a period of time or indefinitely.

Figure 16:
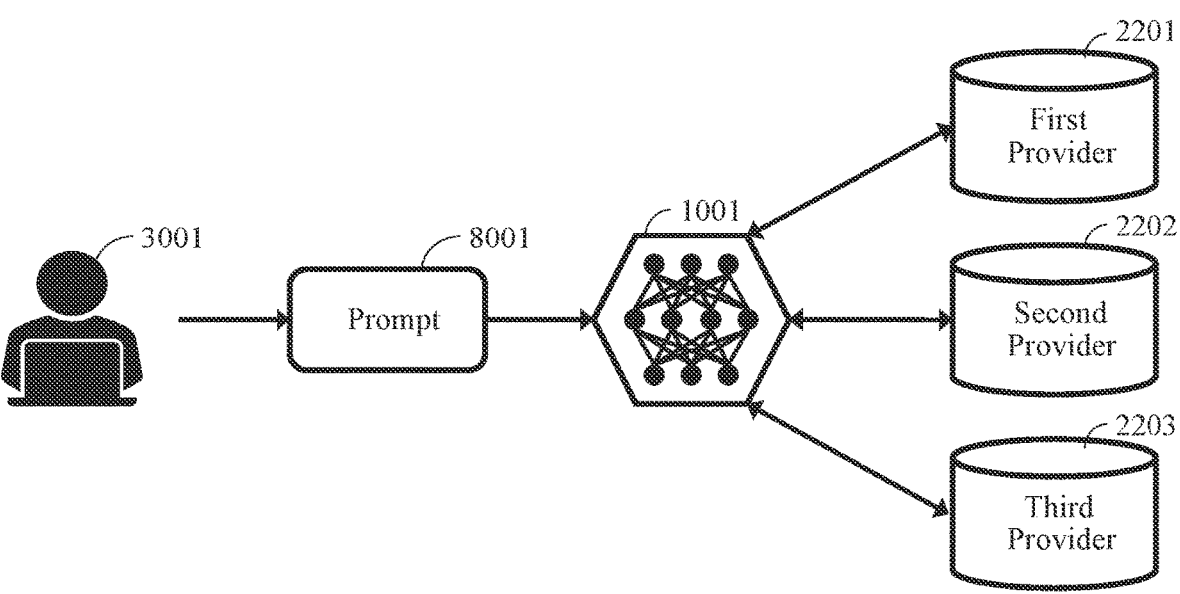
FIG. 16 illustrates an AI program sequentially updating user data on multiple service providers.

FIG. 16 illustrates an AI program sequentially updating user data on multiple service providers. A user 3001 sends a prompt 8001 to an AI program 1001. The AI program 1001 sends an update request to a first service provider 2201. The first service 2201 provider updates information related to the user 3001. The first service 2201 provider returns a success indicator to the AI program 1001. The AI program 1001 sends an update request to a second service provider 2202. The second service 2202 provider updates information related to the user 3001. The second service 2202 provider returns a success indicator to the AI program 1001. Optionally, the AI 1001 repeats this process for additional service providers 2203.

In one embodiment, the AI program 1001 retrieves information from the first service provider 2201 and sends that information to the second service provider 2202 in the next update request.

In one embodiment, the prompt 8001 explicitly instructs the AI 1001 to perform sequential updates, such as "Do X then Y." In another embodiment, the prompt 8001 explicitly states a single update, but the AI 1001 infers multiple implicit updates. For example, "Schedule a fun weekend in Las Vegas," might require booking a flight, a hotel, and show from three different service providers.

In one embodiment, the AI 1001 uses principals similar to atomicity, consistency, isolation, durability (ACID) used in databases. For example, if the AI 1001 is unable to update the second provider 2202 for any reason, it will send a message to the first provider 2201 to undo the recent update.

Optionally, the multiple service provider method of FIG. 16 utilizes the update, confirmation, and/or authentication method of FIG. 15 for one or more service providers.

Figure 17:
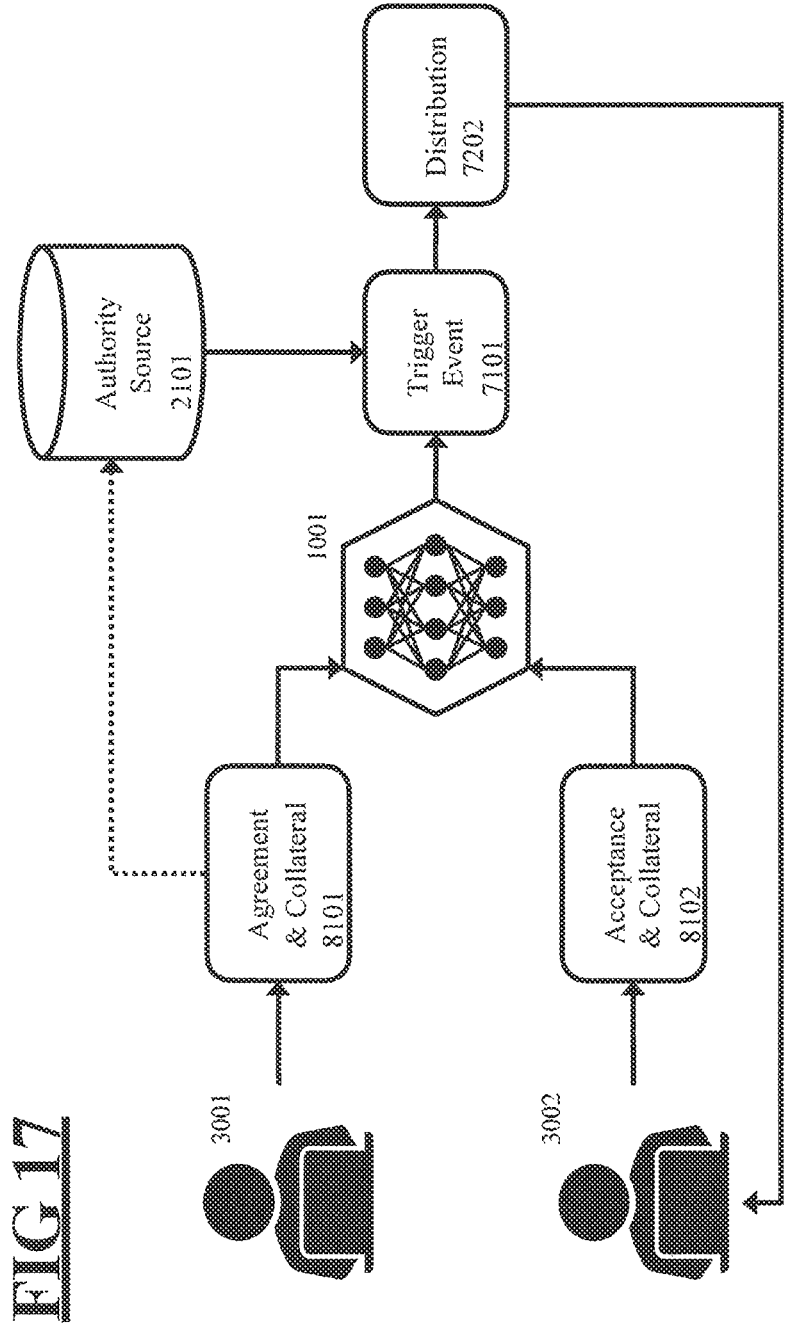
FIG. 17 illustrates two parties agreeing to a transaction using an AI.

FIG. 17 illustrates two parties agreeing to a transaction using an AI. In one example, the AI acts as an escrow agent. A first user 3001 sends a message comprising an agreement and collateral 8101 to an AI program 1001. A second user 3002 sends a message comprising an acceptance statement and collateral 8102 to the AI program 1001. The AI receives data from an authority source 2101 named in the agreement 8101 which initiates a trigger event 7101. The AI then distributes 7102 the collateral according to the agreement.

The agreement 8101 is optionally written in human language (such as English), computer code (such as Python or Solidity), or structured data (such as JSON or YAML). In one embodiment, the AI 1001 deploys the agreement 8101 as a blockchain smart contract.

Collateral optionally includes currency, financial securities, blockchain tokens, domain names, real estate, software code, encoded text, intellectual property, or similar. In one embodiment, collateral comprises access to an account such as a bank account. In one embodiment, collateral comprises a periodic payment, such as monthly payment. Optionally, the first user 3001 sends the agreement and collateral 8101 in two distinct steps. Optionally, the second user 3002 sends the acceptance and collateral 8102 in two distinct steps. For example, the AI 1001 receives the messages in the order of agreement, acceptance, collateral, collateral. Preferably, the agreement 8101 specifies instructions in the event that one party does not provide their required collateral.

The authority source 2101 is optionally a financial market (such as the NYSE or CME), a news website, a bank, a government agency website. In one embodiment, the AI 1001 access the authority source 2101 through its API. In one embodiment, the authority source 2101 is similar to or is actually a blockchain oracle.

In one embodiment, distribution 7202 comprises updating one or more third party providers as illustrated in FIG. 15 and FIG. 16. In one embodiment, distribution 7202 comprises decoding a text. In one embodiment, distribution 7202 comprises transferring blockchain tokens.

In one example, the first user 3001 is an insurer, the second user 3002 is a customer, and the authority source 2101 is a government agency. That insurer writes an agreement 8101 to pay the customer upon a government agency declaring a certain event. For example, the insurer will pay life insurance benefits to the customer's estate upon a coroner issuing an electronic death certificate.

PREFERRED COMPONENTS OF THE INVENTION

The following describes some of the components variously used in certain embodiments of the present invention. Certain embodiments use additional components not listed here.

One embodiment of the present invention comprises advertising. Advertising is the practice and techniques employed to bring attention to a product or service. Advertising aims to put a product or service in the spotlight in hopes of drawing it attention from consumers. It is typically used to promote a specific good or service, but there are wide range of uses, the most common being the commercial advertisement.

One embodiment of the present invention comprises affiliate marketing. Affiliate marketing is a marketing arrangement in which affiliates receive a commission for each visit, signup or sale they generate for a merchant.

One embodiment of the present invention comprises AI or artificial intelligence. AI is a computer program or model capable of intelligent behavior.

One embodiment of the present invention comprises an application programming interface or API. An application programming interface is a connection between computer programs wherein one program offers a known a service to another program. A program may offer an API locally to other programs on the same computer or a program may offer an API through a network interface.

One embodiment of the present invention comprises audio. Audio computer file formats include 3GP, AA, AAC, MP3 OGG, WAV, WMA, WEBM, and similar.

One embodiment of the present invention comprises Bitcoin or BTC. Bitcoin is a cryptocurrency protocol which implements a highly available, public, and decentralized ledger. In order to update the ledger, a user must prove they control an entry in the ledger.

One embodiment of the present invention comprises a blockchain. A blockchain is a list of records linked cryptographically and stored on a computer network. Constituent records are called blocks and typically comprise a cryptographic hash of the previous block and a timestamp. Example blockchains include Bitcoin, Ethereum, Polygon, Binance, Ripple, Cardano, Solana, Polkadot, Near, Avalanche, Litecoin, Monero, Arbitrum, Optimism, Lightning Network, and similar. Blockchains known as Layer-1 blockchains exists independently, blockchains known as Layer-2 are dependent on Layer-1 blockchains.

One embodiment of the present invention comprises a blockchain address. A blockchain address is a string associated with a public-private keypair for a user on a blockchain. Blockchain addresses are commonly represented as hexadecimal strings such as 0x1234ABC. Blockchain smart contracts are typically assigned a unique blockchain address to which users send messages to execute the program.

One embodiment of the present invention comprises a blockchain smart contract. A blockchain smart contract is a computer program that is automatically executed by nodes of a blockchain network. Example blockchains that utilize smart contracts include Ethereum and Solana.

One embodiment of the present invention comprises a blockchain token or coin or cryptocurrency. A blockchain token is a mathematical representation of asset ownership on a blockchain. Example Ethereum token types include ERC-20 fungible tokens, ERC-721 non-fungible tokens, and ERC-1155 semi-fungible tokens.

One embodiment of the present invention comprises a bonding curve. A bonding curve is a mathematical concept used to describe the relationship between price and the supply of an asset.

One embodiment of the present invention comprises CAD or computer-aided design. CAD is the use of computers to aid in the creation, modification, analysis, or optimization of a physical design. This software is used to increase the productivity of the designer, improve the quality of design, improve communications through documentation, and to create a database for manufacturing.

One embodiment of the present invention comprises a CBDC or central bank digital currency. A CBDC is a digital liability of a central bank that is widely available to the general public. It can be considered a cryptocurrency backed by a central bank.

One embodiment of the present invention comprises a client or network client or computer client. A client is a computer initiating a request to a server computer over a network.

One embodiment of the present invention comprises cloud computing. Cloud computing is the process of granting on-demand control of a computer to a user over a network.

One embodiment of the present invention comprises a cloud provider. A cloud provider is a legal person offering cloud computing. Example cloud providers include AMAZON web services, GOOGLE CLOUD services, and MICROSOFT AZURE services.

One embodiment of the present invention comprises cloud storage. Cloud storage is the special case of cloud computing focused on offering on-demand storage and network transmission of data.

One embodiment of the present invention comprises a CNN or convolutional neural network or ConvNet. A CNN is a class of artificial neural network (ANN), most commonly applied to analyze visual imagery.

One embodiment of the present invention comprises a commission. A commission is a fee for services rendered based on a percentage of an amount received or collected or agreed to be paid (as distinguished from a salary).

One embodiment of the present invention comprises a computer or computing device or computing system. A computer is a physical device comprising at least one computer-readable storage medium and at least one processor. A computer operates by reading input data from a computer-readable storage medium, reading instructions from a computer readable storage medium, and executing the input data and instructions with the processor to produce output data. Output data is typically stored in a computer-readable storage medium and/or outputted to a user. Computer form factors include desktops, laptops, smart phones, smart watches, and servers.

One embodiment of the present invention comprises a computer network or network. A computer network is two or more computers comminating. Network data may be sent as electric pulses over copper wire, light pulses over optical fiber, and/or radio waves over the air.

One embodiment of the present invention comprises computer vision. Computer vision tasks include methods for acquiring, processing, analyzing and understanding digital images, and extraction of high-dimensional data from the real world in order to produce numerical or symbolic information, e.g. in the forms of decisions.

One embodiment of the present invention comprises a copyright. A copyright is a type of intellectual property that gives its owner the exclusive right to copy, distribute, adapt, display, and perform a creative work, usually for a limited time. The creative work may be in a literary, artistic, educational, or musical form. Copyright is intended to protect the original expression of an idea in the form of a creative work, but not the idea itself. A copyright is subject to limitations based on public interest considerations, such as the fair use doctrine in the United States.

One embodiment of the present invention comprises CPM or cost per thousand impressions. CPM refers to the cost of traditional advertising or Internet marketing or email advertising campaigns, where advertisers pay for each 1,000 times an advertisement is displayed.

One embodiment of the present invention comprises a CRSM or computer-readable storage medium or computer data storage medium or storage. A CRSM is a physical device containing input data and/or instructions for use by a computer. Common CRSMs include hard drives (HDD), solid state drives (SSD), flash drives, tape drives, magnetic tape, Compact Discs (CD), Digital Video Discs (DVD), Blue-rays, optical drives, floppy disks, zip drives, random access memory (RAM), read only memory (ROM), and punch cards.

One embodiment of the present invention comprises CRUD or create/read/update/delete or manipulate. CRUD are the four basic operations on stored data. In SQL, these terms typically correspond to INSERT, SELECT, UPDATE, and DELETE. In HTTP, these terms typically correspond to POST, GET, PUT, DELETE.

One embodiment of the present invention comprises cryptography. Cryptography is the practice and study of techniques for secure communication in the presence of adversarial behavior. In computer science, common cryptographic techniques include Diffie-Hellman, X.509, Rivest-Shamir-Adleman (RSA), and Elliptic-curve cryptography (ECC), and Elliptic Curve Digital Signature Algorithm (ECDSA).

One embodiment of the present invention comprises a CSS or cascading style sheet. A CSS is a style sheet language used for describing the presentation of a document written in a markup language such as HTML.

One embodiment of the present invention comprises data compression. Data compression is the process of encoding information using fewer bits than the original representation. Compression can be lossless, which preserves all original information, or lossy, which inexactly represent the original information. Example compression algorithms include JPEG, MPEG, PNG, H.264, and ZIP.

One embodiment of the present invention comprises a database or data base or DB or computer database. A database is an organized set of data stored on a computer-readable storage medium for manipulation by a database program.

One embodiment of the present invention comprises database cell or cell. Database cell is the value of one row at one column in a database table.

One embodiment of the present invention comprises a database column or column. A database column is a set of values of a particular type, with each row having one value per column in a table.

One embodiment of the present invention comprises a database management system or DBMS or database program or database software. A database management system is a special case program to manipulate a database. Example database management systems include MYSQL system, MICROSOFT ACCESS system, SQLITE system, POST-GRESQL system, MARIADB system, COUCHBASE system, REDIS system, MONGODB system, and HBASE system.

One embodiment of the present invention comprises a database right. A database right is a sui generis property right, comparable to but distinct from copyright, that exists to recognize the investment that is made in compiling a database, even when this does not involve the creative aspect that is reflected by copyright. Such rights are often referred to in the plural: database rights. The Agreement on Trade-Related Aspects of Intellectual Property Rights (TRIPS) Agreement requires that copyright protection extends to databases and other compilations if they constitute intellectual creation by virtue of the selection or arrangement of their contents, even if some or all of the contents do not themselves constitute materials protected by copyright.

One embodiment of the present invention comprises a database row or row or tuple. A database row is an entry in a database table comprising one value per column of the table.

One embodiment of the present invention comprises database table or table. Database table is One embodiment of the present invention comprises a domain name. A domain name is an identification string that defines a realm of administrative authority within the Internet. Domain names are used in various networking contexts and for application-specific naming and addressing purposes. Generally, a domain name points to a server at a given IP address.

One embodiment of the present invention comprises a download. A download is the transmission of data from a server computer to a client computer over a network.

One embodiment of the present invention comprises the EIP or Ethereum improvement proposal. The EIP is a prefix for Ethereum standards, followed by a number, such as EIP-165.

One embodiment of the present invention comprises the ERC or Ethereum request for comments. The ERC is a prefix for Ethereum standards, followed by a number, such as ERC-20.

One embodiment of the present invention comprises the ERC-1155. The ERC-1155 is a free, open standard that describes how to build semi-fungible or unique tokens on the Ethereum blockchain.

One embodiment of the present invention comprises the ERC-20. The ERC-20 is a free, open standard that describes how to build fungible tokens on the Ethereum blockchain.

One embodiment of the present invention comprises the ERC-721. The ERC-721 is a free, open standard that describes how to build non-fungible or unique tokens on the Ethereum blockchain.

One embodiment of the present invention comprises Ethereum. Ethereum is a blockchain network with smart contract functionality developed in 2014 by Vitalik Buterin and others.

One embodiment of the present invention comprises Ethernet. Ethernet is a family of wired computer networking technologies commonly used in local area networks (LAN), metropolitan area networks (MAN) and wide area networks (WAN).

One embodiment of the present invention comprises hardware or computer hardware. Hardware is the collection of physical devices comprising a computer.

One embodiment of the present invention comprises a hash function or hash. A hash function is a function that converts input data of arbitrary size to an output value of fixed size. Hashes are often used in checksums, check digits, fingerprints, lossy compression, randomization functions, error-correcting codes, and ciphers. Hashes may be implemented by software, hardware, or both. Example hash functions include Secure Hash Algorithm 2 (SHA2), Message-Digest Algorithm 5 (MD5), and cyclic redundancy check 32 (CRC32).

One embodiment of the present invention comprises HTML or HyperText Markup Language. HTML is the standard markup language for displaying documents in a web browser.

One embodiment of the present invention comprises a HTTP cookie or cookie. A HTTP cookie is a piece of data stored on a client computer used for storing state information when communicating with a server. Typically, cookies are handled by web browsers.

One embodiment of the present invention comprises an IDE or integrated development environment. An IDE is a software application that provides comprehensive facilities to computer programmers for software development, typically consisting of a source code editor, build automation tools, and a debugger.

One embodiment of the present invention comprises an input device. An input device is a physical device which initiates a computer execution. Such execution includes storing data, storing instructions, and/or selecting instructions and data to execute in the future. Input devices include computer keyboards, keypads, computer mice, touch screens, microphones, cameras, card readers, scanners, bar code readers, chip readers, magnetic tape readers, network modem (wired or wireless), and Bluetooth receiver.

One embodiment of the present invention comprises the Internet. The Internet is the global system of interconnected computer networks that uses the TCP/IP protocol to communicate.

One embodiment of the present invention comprises an Internet Protocol address or IP address. An Internet Protocol address is a unique number identifying a computer connected to the Internet. Internet Protocol version 4 (IPv4) addresses comprise 32 bits. Internet Protocol version 6 (IPv6) addresses comprise 128 bits.

One embodiment of the present invention comprises the IoT or Internet of Things. The IoT describes physical objects with sensors, processing ability, software and other technologies that connect and exchange data with other devices and systems over the Internet or other communications networks.

One embodiment of the present invention comprises a language model. A language model is a probability distribution over sequences of words. Given any sequence of words, a language model assigns a probability to the whole sequence. Language models are often used to respond in human language to a human language prompt. GPT-3 is an example language model.

One embodiment of the present invention comprises linear regression. Linear regression is a linear approach for modelling the relationship between a scalar response and one or more explanatory variables (also known as dependent and independent variables). The case of one explanatory variable is called simple linear regression; for more than one, the process is called multiple linear regression.

One embodiment of the present invention comprises low code or no code. Low code describes a software development process by which a computer program executes computer instructions according to non-code input from a user, typically inputted though a graphical user interface. Ideally, a no code program allows a user to design a computer program without knowing complicated code syntax.

One embodiment of the present invention comprises machine learning or ML. Machine learning algorithms build a model based on sample data, known as training data, in order to make predictions or decisions without being explicitly programmed to do so. Machine learning algorithms are used in a wide variety of applications, such as in medicine, email filtering, speech recognition, agriculture, and computer vision, where it is difficult or unfeasible to develop conventional algorithms to perform the needed tasks.

One embodiment of the present invention comprises a markup language. A markup language is a syntax for annotating a document in a way that is visually distinguishable from the content. Markup languages typically do not contain executable instructions. Example markup languages include HTML, LaTex, and Markdown.

One embodiment of the present invention comprises metadata. Metadata is data that provides information about other data, but not the content of the data itself. Metadata may describe the format, size, compression, authorship, ownership, copyright, legal, creation date, modification date, ordering, keywords, permissions, or other information about the primary data.

One embodiment of the present invention comprises a microprocessor. A microprocessor is a special case processor that converts a digital electric input signal into a digital electric output signal through a clock-driven integrated circuit comprising logic gates. Example commercial microprocessors include the Intel 4004, the Intel Pentium line, the IBM PowerPC line, the and the Motorola 68000.

One embodiment of the present invention comprises a mobile application or mobile app. A mobile application is an application that runs on a portable computer. Example mobile application operating systems include APPLE IOS operating system and GOOGLE ANDROID operating system.

One embodiment of the present invention comprises multimedia. Multimedia computer file formats include DOC, DOCX, FLV, HTML, OPD, PDF, PPT, and PPTX.

One embodiment of the present invention comprises multitenant. Multitenant describes a computer containing software programs from disparate tenants. A multitenant computer may have disparate companies as tenants. A multitenant computer may also have disparate groups/developers from a single company as tenants.

One embodiment of the present invention comprises a network protocol or protocol. A network protocol is a predefined signal syntax allowing two computers to communicate over a network. Protocols may be implemented by software, hardware, or both. Protocols are typically 'layered,' wherein more specific protocols are transmitted within more generic protocols. Example protocols include Address Resolution Protocol (ARP), Internetwork Packet Exchange (IPX), Transmission Control Protocol (TCP), Internet Protocol (IP), User Datagram Protocol (UDP), HyperText Transfer Protocol (HTTP), Secure Socket Layer (SSL), Transport Layer Security (TLS), File Transport Protocol (FTP), Secure File Transport Protocol (SFTP), Secure Shell (SSH), Telnet, Domain Name System (DNS). Internet Control Message Protocol (ICMP), NetBIOS, Remote Procedure Call (RPC), Internet Relay Chat (IRC), Network Time Protocol (NTP), Internet Message Access Protocol (IMAP), Post Office Protocol (POP), and Simple Mail Transfer Protocol (SMTP).

One embodiment of the present invention comprises a network router or router. A network router is a networking device that forwards data packets between computer networks. A router may itself be a computer.

One embodiment of the present invention comprises a network switch or switch or switching hub or bridging hub. A network switch is a networking device that connects other devices on a computer network by using packet switching to receive and forward data to the destination device.

One embodiment of the present invention comprises a neural network or NN or artificial neural network or ANN. A neural network is a computing system inspired by the biological neural network, typically comprising layers of neurons interconnected by synapses.

One embodiment of the present invention comprises a NFT or non-fungible token. A NFT is a unique and non-interchangeable unit of data stored on a blockchain. NFTs use a digital ledger to provide a public certificate of authenticity or proof of ownership. The lack of interchangeability (fungibility) distinguishes NFTs from blockchain cryptocurrencies, such as Bitcoin.

One embodiment of the present invention comprises NLP or natural language processing. NLP is the interdisciplinary subfield of linguistics, computer science, and artificial intelligence concerned with the interactions between computers and human language, in particular how to program computers to process and analyze large amounts of natural language data.

One embodiment of the present invention comprises open source. Open source describes a software program that is made freely available for possible modification and redistribution.

One embodiment of the present invention comprises an operating system or OS. An operating system is system software that manages computer hardware and software resources, and provides common services for computer programs. Example operating systems (OS) include LINUX OS, APPLIE IOS, APPLE MACOS, AND MICROSOFT WINDOWS OS.

One embodiment of the present invention comprises PPC or pay-per-click. PPC is an Internet advertising model used to drive traffic to websites, in which an advertiser pays a publisher (typically a search engine, website owner, or a network of websites) when the ad is clicked.

One embodiment of the present invention comprises a privacy policy. A privacy policy is a document describing how a service provider will handle user data. The document may include regulatory policies such as Family Educational Rights and Privacy Act (FERPA), Children's Online Privacy Protection Act (COPPA), and Health Insurance Portability and Accountability Act (HIPAA).

One embodiment of the present invention comprises a processor. A processor is a physical device that deterministically executes input signals into output signals. Signals are typically electric. Signals may be digital or analog.

One embodiment of the present invention comprises a program or computer program or piece of software or software program or computer application or application or app. A program is a distinct document of software. A program may reference and execute other programs. Example programs include MICROSOFT WORD program, WORDPRESS program, APPLE IOS program, SQLITE program.

One embodiment of the present invention comprises a programming language. A programming language is a formal language comprising a set of strings that instruct a computer processor. There are a number of programming languages, each having a specific syntax to encode instructions. Programming languages are typically compiled to machine code for execution at the processor. Example programming languages include: ASP, BASIC, C, C#, C++, COBOL, Erlang, Go, Haskell, Java, JavaScript, Lisp, Objective-C, Perl, Python, PHP, Ruby, Rust, Scala, Solidity, and Vyper.

One embodiment of the present invention comprises a public license or public copyright license. A public license is a license by which a copyright holder as licensor can grant additional copyright permissions to any and all persons in the general public as licensees. By applying a public license to a work, provided that the licensees obey the terms and conditions of the license, copyright holders give permission for others to copy or change their work in ways that would otherwise infringe copyright law. Some public licenses, such as the GNU GPL and the CC BY-SA, are also considered free or open copyright licenses. However, other public licenses like the CC BY-NC are not open licenses, because they contain restrictions on commercial or other types of use.

One embodiment of the present invention comprises public-key cryptography or asymmetric cryptography. Public-key cryptography is the field of cryptographic systems that use pairs of related keys. Each key pair consists of a public key and a corresponding private key. Key pairs are generated with cryptographic algorithms based on mathematical problems termed one-way functions. Security of public-key cryptography depends on keeping the private key secret; the public key can be openly distributed without compromising security.

One embodiment of the present invention comprises a RDBMS or relational database management system. A RDBMS is a special case database management system using tuple principles.

One embodiment of the present invention comprises a REST or representational state transfer. A REST is an API design in which a client sends an HTTP request to a server which responds with structured data in XML, JSON, similar format.

One embodiment of the present invention comprises a RNN or recurrent neural network. A RNN is a class of artificial neural network (ANN) where connections between nodes can create a cycle, allowing output from some nodes to affect subsequent input to the same nodes.

One embodiment of the present invention comprises robots.txt. Robots.txt is a standard used by websites to indicate to visiting web crawlers and other web robots which portions of the website they are allowed to visit.

One embodiment of the present invention comprises a search engine. A search engine is a computer program designed to search documents, typically across the World Wide Web. Example search engines include MICROSOFT BING search engine, GOOGLE search engine, DUCK-DUCKGO search engine.

One embodiment of the present invention comprises a server or web server or network server. A server is a special case computer optimized for receiving requests and sending responses over a computer network.

One embodiment of the present invention comprises SHAP or SHapley Additive exPlanations. SHAP is a mathematical method to explain the predictions of machine learning models. It is based on the concepts of game theory and can be used to explain the predictions of any machine learning model by calculating the contribution of each feature to the prediction.

One embodiment of the present invention comprises social media. Social media comprises interactive technologies that facilitate the creation and sharing of information, ideas, interests, and other forms of expression through virtual communities and networks. Examples include Facebook, Twitter, and YouTube.

One embodiment of the present invention comprises a social network or social networking service. A social network is a computer program storing relationships between users, typically including features such as messaging, blogging, or picture uploading. Such services include BLOGGER network, CHESS.COM network, CLASSDOJO network, DISCORD network, FACEBOOK network, GITHUB network, INSTAGRAM network, MEDIUM network, PINTEREST network, QUORA network, REDDIT network, REMIND network, SNAPCHAT network, STACK OVERFLOW network, STEAM network, TELEGRAM network, TIKTOK network, TWITCH network, TWITTER network, WECHAT network, WHATSAPP network, YAMMER network, YOUTUBE network, and similar.

One embodiment of the present invention comprises software or computer software or computer code or code. Software is instructions stored on a computer-readable storage medium to be executed by a computer processor.

One embodiment of the present invention comprises source ranking. Source ranking is the process of ranking the importance of various training source data in explaining the output of a neural network. For example, a neural network generates a song lyric and, when queried, displays a list of websites containing similar song lyrics as a source ranking.

One embodiment of the present invention comprises a spreadsheet. A spreadsheet is a document containing human-readable data structured in rows and columns.

One embodiment of the present invention comprises a spreadsheet program. A spreadsheet program is a special case program for manipulating spreadsheets.

One embodiment of the present invention comprises SQL or Simple Query Language. SQL is a domain-specific computer language for manipulating data in a relational database management system.

One embodiment of the present invention comprises a tenant. A tenant is a software developer whose program is running on a computer controlled by another party. Typically, tenants pay to rent server computing resources from cloud providers. Alternatively, a device owner may install a tenant's software on their device for the benefits of controlling and using the software, such as on a desktop, laptop, or smart phone.

One embodiment of the present invention comprises a TOS or terms of service. A TOS is a legal agreement between a user and a service provider.

One embodiment of the present invention comprises a training source. A training source is a data source which is used in the training of a neural network. Training sources can be in a number of mediums including text, image, video, audio, or other multimedia. A common type of training source is a website.

One embodiment of the present invention comprises a tuple. A tuple is a data structure comprising a list of elements, including enumerated arrays and associative arrays.

One embodiment of the present invention comprises an URL or uniform resource locator or web address. An URL is a reference to a web resource that specifies its location on a computer network and a mechanism for retrieving it. A typical URL could have the form http://www.example.com/index.html, which indicates a protocol (http), a hostname (www.example.com), and a file name (index.html).

One embodiment of the present invention comprises a user. A user is an entity initiating an execution on a computer. Typically, a user is a human interacting with an input device. Alternatively, a user is a second computer programmed to interact with the former computer.

One embodiment of the present invention comprises a vector database. A vector database captures meaning and context of unstructured data by associating an item with a number of vectors. Similar items have similar vector values. Example vector databases include Pinecone and Milvus.

One embodiment of the present invention comprises video. Video computer file formats include 3GP, AVI, FLV, GIF, MOV, MP2, MP4, WEBM, WMV, and similar.

One embodiment of the present invention comprises a virtual machine. A virtual machine is a virtualization/emulation of a computer system. Virtual machines are based on computer architectures and provide functionality of a physical computer. Their implementations may involve specialized hardware, software, or a combination.

One embodiment of the present invention comprises a virtual reality or VR. Virtual reality is a simulated experience that employs pose tracking and 3D near-eye displays to give the user an immersive feel of a virtual world. Applications of virtual reality include entertainment, video games, education, medical training, military training, business, and virtual meetings. Other distinct types of VR-style technology include augmented reality (AR) and mixed reality, sometimes referred to as extended reality or XR, although definitions shifting as the industry develops.

One embodiment of the present invention comprises a web browser or browser or Internet browser. A web browser is a program for browsing the World Wide Web. A typically browser function is to download and render a webpage comprising HTML, JavaScript, and/or CSS. Example web browsers include MICROSOFT INTERNET EXPLORER browser, MICROSOFT EDGE browser, GOOGLE CHROME browser, APPLE SAFARI browser, and MOZILLA FIREFOX browser.

One embodiment of the present invention comprises a webhost or web host. A webhost is a special case cloud provider specializing in serving documents on the World Wide Web.

One embodiment of the present invention comprises a webpage or web page. A webpage is an HTML document on the World Wide Web.

One embodiment of the present invention comprises a website or web site. A website is a group of related web pages controlled by one legal person.

One embodiment of the present invention comprises a wire transfer or bank transfer or credit transfer. A wire transfer is a method of electronic funds transfer from one person or entity to another. A wire transfer can be made from one bank account to another bank account, or through a transfer of cash at a cash office. Examples include real-time gross settlement (RTGS), clearing house interbank payments system (CHIPS), society for worldwide interbank financial telecommunication (SWIFT), Fedwire, and Western Union.

One embodiment of the present invention comprises a word processor. A word processor is a program for humans to compose human-readable documents.

One embodiment of the present invention comprises the World Wide Web or WWW or web. The World Wide Web is an information network of hyperlinked documents transmitted from web servers to client web browsers over the Internet using the HTTP protocol invented by Sir Timothy Berners-Lee in 1989 at CERN. Transmitted documents typically comprise HTML, CSS, and JavaScript.

One embodiment of the present invention comprises zero-knowledge proof or ZK proof. Zero-knowledge proof is the process by which one party (the prover) can prove to another party (the verifier) that a given statement is true while the prover avoids conveying any additional information apart from the fact that the statement is indeed true. A non-interactive zero-knowledge proof requires no interaction between the prover and verifier. These cryptographic techniques are used to bundle transactions on blockchains. Examples include NIZK, zk-SNARK, and zk-STARK.

We claim as our invention the following:

1. A non-transitory computer-readable storage medium storing instructions that, when executed by one or more processors, cause a system to perform operations comprising:

receiving, at a network interface, at least one file comprising data and at least one machine-readable condition for use of the data in training machine-learning models;

training, at a processor, a machine-learning model with the data;

writing, to a computer-readable storage medium, the machine-learning model and the machine-readable condition associated with an identifier;

receiving, at a network interface, a prompt from a user;

executing, at the processor, the machine-learning model in conjunction with the prompt to generate an intermediate output that comprises the identifier;

reading, from a computer-readable storage medium, according to the identifier, the machine-readable condition;

evaluating, at the processor, the machine-readable condition and, during generation of a response for the user, performing at least one action defined by the machine-readable condition comprising modifying the response; and outputting, at a network interface, the response to the user.

2. The non-transitory computer-readable storage medium of claim 1, wherein the performed action comprises crediting a payment to a designated party.

3. The non-transitory computer-readable storage medium of claim 2, wherein the credited payment is recorded on a blockchain using a cryptographic signature.

4. The non-transitory computer-readable storage medium of claim 1, wherein the performed action comprises inserting designated messaging into the response.

5. The non-transitory computer-readable storage medium of claim 4, wherein the designated messaging comprises an identifier string.

6. The non-transitory computer-readable storage medium of claim 5, wherein the identifier string comprises a tracking code.

7. The non-transitory computer-readable storage medium of claim 5, wherein the identifier string comprises an affiliate code.

* * * * *